(12) United States Patent
Zheng

(10) Patent No.: US 12,080,866 B1
(45) Date of Patent: Sep. 3, 2024

(54) ENERGY-STORAGE DEVICE, ELECTRICITY-CONSUMPTION SYSTEM, AND ENERGY-STORAGE SYSTEM

(71) Applicants: Shenzhen Hithium Energy Storage Technology Co., Ltd., Guangdong (CN); Xiamen Hithium Energy Storage Technology Co., Ltd., Fujian (CN)

(72) Inventor: Zhenhua Zheng, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/639,273

(22) Filed: Apr. 18, 2024

(30) Foreign Application Priority Data

Jun. 14, 2023 (CN) .......................... 202310702420.3

(51) Int. Cl.
  *H01M 10/658* (2014.01)
  *H01M 10/651* (2014.01)
  *H01M 50/342* (2021.01)

(52) U.S. Cl.
  CPC ....... *H01M 10/658* (2015.04); *H01M 10/651* (2015.04); *H01M 50/3425* (2021.01)

(58) Field of Classification Search
  None
  See application file for complete search history.

(56) References Cited

U.S. PATENT DOCUMENTS

2011/0262799 A1* 10/2011 Kim ..................... H01M 50/289
  429/156
2015/0072175 A1* 3/2015 DeKeuster .......... H01M 10/486
  429/7

(Continued)

FOREIGN PATENT DOCUMENTS

| CN | 110190211 A | 8/2019 |
| CN | 110767865 A | 2/2020 |

(Continued)

OTHER PUBLICATIONS

WO2021246390A1_Machine translation (Year: 2021).*

(Continued)

*Primary Examiner* — Haroon S. Sheikh
*Assistant Examiner* — Aryana Y. Ortiz
(74) *Attorney, Agent, or Firm* — IP Spring

(57) ABSTRACT

An energy-storage device, an electricity-consumption system, and an energy-storage system are provided in the disclosure. The energy-storage device includes multiple energy-storage units, an isolation plate, a first thermal insulator, and a second thermal insulator. The multiple energy-storage units are sequentially arranged in a first direction. Each of the multiple energy-storage units includes an explosion-proof valve. The isolation plate is located at one side of each of the multiple energy-storage units where the explosion-proof valve is located, extends in the first direction, and defines multiple vents arranged at intervals in the first direction. Each of the multiple vents is at least partially aligned with a corresponding explosion-proof valve, and different explosion-proof valves are aligned with different vents. The first thermal insulator and the second thermal insulator are both located at one side of the isolation plate away from the multiple energy-storage units.

15 Claims, 14 Drawing Sheets

(56) References Cited

U.S. PATENT DOCUMENTS

2018/0048037 A1    2/2018  Newman
2021/0175572 A1    6/2021  He et al.

FOREIGN PATENT DOCUMENTS

| | | |
|---|---|---|
| CN | 211828927 U | 10/2020 |
| CN | 113113740 A | 7/2021 |
| CN | 215644671 U | 1/2022 |
| CN | 216288635 U | 4/2022 |
| CN | 216488307 U | 5/2022 |
| CN | 216529122 U | 5/2022 |
| CN | 114597574 A | 6/2022 |
| CN | 115275501 A | 11/2022 |
| CN | 115602994 A | 1/2023 |
| CN | 218498296 U | 2/2023 |
| CN | 115954594 A | 4/2023 |
| CN | 115966845 A | 4/2023 |
| KR | 20210019158 A | 2/2021 |
| WO | WO-2021246390 A1 * | 12/2021 |

OTHER PUBLICATIONS

CNIPA, International Search Report for International Patent Application No. PCT/CN2024/072798, Mar. 29, 2024, 6 pages.
CNIPA, Written Opinion for International Patent Application No. PCT/CN2024/072798, Mar. 29, 2024, 10 pages.
CNIPA, First Office Action for corresponding Chinese Patent Application No. 202310702420.3, Jul. 25, 2023, 13 pages.
CNIPA, Notice of Allowance for corresponding Chinese Patent Application No. 202310702420.3, Aug. 10, 2023, 6 pages.

* cited by examiner

ENERGY-STORAGE DEVICE, ELECTRICITY-CONSUMPTION SYSTEM, AND ENERGY-STORAGE SYSTEM

CROSS-REFERENCE TO RELATED APPLICATIONS

This application claims priority under 35 U.S.C. § 119(a) to and the benefit of Chinese Patent Application No. 202310702420.3, filed Jun. 14, 2023, the entire disclosure of which is incorporated herein by reference.

TECHNICAL FIELD

The disclosure relates to the field of electronics, and in particular, to an energy-storage device, an electricity-consumption system, and an energy-storage system.

BACKGROUND

Within an energy-storage device, multiple energy-storage units (such as multiple battery units) are usually arranged. The multiple energy-storage units are electrically connected to each other via electrical connectors, and parameters (such as voltage and temperature) of the multiple energy-storage units can be collected through wire harnesses. When thermal runaway occurs in some of the energy-storage units, causing explosion-proof valves to burst and release a large amount of high-temperature high-pressure flammable gas, the high-temperature gas can rapidly fill the entire internal space of the energy-storage device. The high-temperature flammable gas can easily melt insulation layers on surfaces of wire harnesses, electrical connectors, etc., leading to insulation failure or short circuits of the wire harnesses or the electrical connectors.

SUMMARY

In embodiments of a first aspect of the disclosure, an energy-storage device is provided. The energy-storage device includes multiple energy-storage units, an isolation plate, a first thermal insulator, and a second thermal insulator. The multiple energy-storage units are sequentially arranged in a first direction. Each of the multiple energy-storage units includes an explosion-proof valve. The isolation plate is located at one side of each of the multiple energy-storage units where the explosion-proof valve is located, extends in the first direction, and defines multiple vents arranged at intervals in the first direction. Each of the multiple vents is at least partially aligned with a corresponding explosion-proof valve, and different explosion-proof valves are aligned with different vents. The first thermal insulator and the second thermal insulator are both located at one side of the isolation plate away from the multiple energy-storage units. The first thermal insulator and the second thermal insulator are spaced apart from each other in a second direction at two opposite sides of each of the multiple explosion-proof valves. The first thermal insulator, the second thermal insulator, and the isolation plate cooperatively define a guide channel. Two opposite ends of the guide channel are both in communication with an external environment and a space in which each of the multiple explosion-proof valves faces the isolation plate, and the first direction intersects the second direction.

The first thermal insulator includes a first thermal insulation portion and a second thermal insulation portion that are connected to each other and arranged in the first direction. The second thermal insulator includes a third thermal insulation portion and a fourth thermal insulation portion that are connected to each other and arranged in the first direction. The first thermal insulation portion faces the third thermal insulation portion. A distance between the first thermal insulation portion and the third thermal insulation portion gradually increases in a direction from one end of the first thermal insulation portion close to the second thermal insulation portion and one end of the third thermal insulation portion close to the fourth thermal insulation portion to another end of the first thermal insulation portion away from the second thermal insulation portion and another end of the third thermal insulation portion away from the fourth thermal insulation portion. The second thermal insulation portion faces the fourth thermal insulation portion. A distance between the second thermal insulation portion and the fourth thermal insulation portion gradually increases in a direction from one end of the second thermal insulation portion close to the first thermal insulation portion and one end of the fourth thermal insulation portion close to the third thermal insulation portion to another end of the second thermal insulation portion away from the first thermal insulation portion and another end of the fourth thermal insulation portion away from the third thermal insulation portion.

An angle α between a surface of the first thermal insulation portion facing the third thermal insulation portion and a surface of the third thermal insulation portion facing the first thermal insulation portion satisfies $5°≤α≤30°$. An angle β between a surface of the second thermal insulation portion facing the fourth thermal insulation portion and a surface of the fourth thermal insulation portion facing the second thermal insulation portion satisfies $5°≤β≤30°$.

The isolation plate includes a main body portion, a first mounting portion, a second mounting portion, a third mounting portion, and a fourth mounting portion. The main body portion defines the multiple vents arranged at intervals in the first direction. The first mounting portion, the second mounting portion, the third mounting portion, and the fourth mounting portion are sequentially arranged at intervals in the second direction on a surface of the main body portion away from the multiple energy-storage units. The first mounting portion and the second mounting portion are both arranged at one side of each of the multiple explosion-proof valves. The main body portion, the first mounting portion, and the second mounting portion cooperatively define a first fitting groove. The first thermal insulator is fitted with the first fitting groove. The third mounting portion and the fourth mounting portion are both arranged at one side of each of the multiple explosion-proof valves away from the first mounting portion and the second mounting portion. The main body portion, the third mounting portion, and the fourth mounting portion cooperatively define a second fitting groove. The second thermal insulator is fitted with the second fitting groove.

The energy-storage device further includes a frame body and a cover plate. The frame body defines an accommodating groove for receiving the multiple energy-storage units, the isolation plate, the first thermal insulator, and the second thermal insulator. The cover plate seals the accommodating groove and is fixed to the frame body. The isolation plate further includes a first elastic portion and a second elastic portion. The first elastic portion and the second elastic portion are both arranged on the surface of the main body portion away from the multiple energy-storage units. At least part of the first elastic portion is received in the first fitting groove and abuts against the first thermal insulator, so that an end face of the first thermal insulator away from the first elastic portion is in tight contact with a surface of the cover plate facing the accommodating groove. At least part of the second elastic portion is received in the second fitting groove and abuts against the second thermal insulator, so that an end face of the second thermal insulator away from the second elastic portion is in tight contact with the surface of the cover plate facing the accommodating groove.

The first elastic portion includes a first support sub-portion and a first protrusion sub-portion. The first support sub-portion is connected to a surface of the main body portion facing the first thermal insulator. The first protrusion sub-portion protrudes from a surface of the first support sub-portion away from the main body portion and abuts against the first thermal insulator. A height h1 of the first protrusion sub-portion satisfies 0.5 mm≤ h1≤1.5 mm in a direction from the first support sub-portion to the first protrusion sub-portion. The second elastic portion includes a second support sub-portion and a second protrusion sub-portion. The second support sub-portion is connected to a surface of the main body portion facing the second thermal insulator. The second protrusion sub-portion protrudes from a surface of the second support sub-portion away from the main body portion and abuts against the second thermal insulator. A height h2 of the second protrusion sub-portion satisfies 0.5 mm≤ h2≤1.5 mm in a direction from the second support sub-portion to the second protrusion sub-portion.

In embodiments of a second aspect of the disclosure, an electricity-consumption system is provided. The electricity-consumption system includes an electricity-consumption apparatus and the energy-storage device provided in the embodiments of the disclosure. The energy-storage device is configured to power the electricity-consumption apparatus.

In embodiments of a third aspect of the disclosure, an energy-storage system is provided. The energy-storage system includes an electrical energy conversion device, the energy-storage device provided in the embodiments of the disclosure, and an electricity-consumption load. The electrical energy conversion device is configured to convert energy other than electrical energy into electrical energy. The energy-storage device is electrically connected to the electrical energy conversion device and is configured to store electrical energy of the electrical energy conversion device. The electricity-consumption load is electrically connected to the electrical energy conversion device and the energy-storage device, and configured to operate by using the electrical energy of the electrical energy conversion device or electrical energy of the energy-storage device.

BRIEF DESCRIPTION OF THE DRAWINGS

To describe technical solutions in embodiments of the disclosure more clearly, the following briefly introduces the accompanying drawings required for describing the embodiments. Apparently, the accompanying drawings in the following description only illustrate some embodiments of the disclosure. Those of ordinary skill in the art may also obtain other drawings based on these accompanying drawings without creative efforts.

Figure 1:
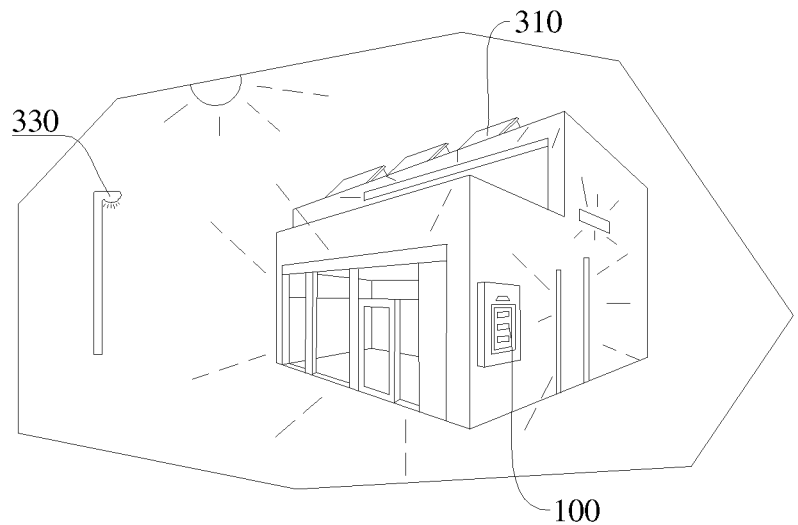
FIG. 1 is a diagram of an application scenario of an energy-storage system according to an embodiment of the disclosure.

Reference numbers are described as follows:

300—energy-storage system; 310—electrical energy conversion device; 330—electricity-consumption load; 200—electricity-consumption system; 210—electricity-consumption apparatus; 100—energy-storage device; 10—energy-storage unit; 11—explosion-proof valve; 20—frame body; 21—accommodating groove; 23—first vent; 25—second vent; 30—isolation plate; 32—main body portion; 321—vent; 33—first mounting portion; 34—second mounting portion; 341—first notch; 35—third mounting portion; 351—second notch; 36—fourth mounting portion; 37—first fitting groove; 38—second fitting groove; 31—first elastic portion; 311—first support sub-portion; 313—first protrusion sub-portion; 315—first arc-shaped transition face; 39—second elastic portion; 391—second support sub-portion; 393—second protrusion sub-portion; 395—second arc-shaped transition face; 40—cover plate; 50—first thermal insulator; 51—first thermal insulation portion; 53—second thermal insulation portion; 60—exhaust device; 70—second thermal insulator; 71—third thermal insulation portion; 73—fourth thermal insulation portion; 101—guide channel; 1011—first guide opening; 1013—second guide opening; 80—wire harness; 90—electrical connector; 102—battery management unit; 103—temperature sensor.

DETAILED DESCRIPTION

To make those of ordinary skill in the art better understand the solutions of the disclosure, technical solutions in implementations of the disclosure will be described clearly and completely hereinafter with reference to the accompanying drawings described. Apparently, the described implementations are merely some rather than all implementations of the disclosure. All other implementations obtained by those of ordinary skill in the art based on the implementations of the disclosure without creative efforts shall fall within the protection scope of the disclosure.

The terms such as "first" and "second" used in the specification, the claims, and the accompanying drawings of the disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other operations or units that are not listed; alternatively, other operations or units inherent to the process, product, or device can be included either.

The technical solutions in the embodiments of the disclosure will be described below with reference to the accompanying drawings.

It may be noted that, for the sake of illustration, in the embodiments of the disclosure, the same reference numbers represent the same components, and for the sake of brevity, in different embodiments, detailed illustration of the same components are omitted.

Currently, the generation of green electrical energy generally relies on photovoltaic energy, wind energy, water potential, and the like. However, wind energy, solar energy, and the other forms of energy generally suffer from strong intermittency and large fluctuations, which can lead to instability of power grid. During peak electricity consumption, there may be insufficient electricity, while during off-peak periods, there may be excess electricity. Unstable voltages can also damage the power grid. Therefore, the "curtailment of wind and solar power" problem may arise due to insufficient electricity demand or insufficient power grid acceptance capacity. To solve these problems, energy storage is necessary. This involves converting electrical energy into energy other than electrical energy through physical or chemical means, storing it, and then converting it back into electrical energy when needed. In simple terms, the energy storage is similar to a large "electric power bank" that stores electrical energy when photovoltaic energy and wind energy are abundant and releases the electrical energy stored when needed.

In view of above, the embodiments of the disclosure provide an energy-storage device. When thermal runaway occurs, the energy-storage device can avoid the spread of thermal runaway, thereby improving the safety of the energy-storage device.

Taking electrochemical energy storage as an example, this solution provides an energy-storage device 100, where a chemical battery is disposed in the energy-storage device 100. Chemical elements in a chemical battery is mainly used as an energy-storage medium, and a charging and discharging process is accompanied by chemical reactions or changes of the energy-storage medium. In simple terms, electrical energy generated by wind energy and solar energy can be stored in the chemical battery, and when external electricity usage peaks, the electrical energy stored can be released for use, or transferred to areas with insufficient electricity.

The current application scenarios of energy storage are relatively extensive, including power-generating-side energy storage, grid-side energy storage, renewable energy grid integration energy storage, and user-side energy storage. The corresponding types of energy-storage devices 100 include:

(1) large-scale energy-storage containers used in grid-side energy-storage scenarios, which can serve as a high-quality active and reactive power regulation power supply in a power grid, realize load matching of electrical energy in time and space, enhance the ability to integrate renewable energy, and are significant in terms of grid system standby, alleviating peak load supply pressure, and peak shaving and frequency regulation;

(2) small to medium-sized energy-storage cabinets used in industrial and commercial energy-storage scenarios (banks, shopping malls, etc.) on the user side, as well as small-sized household energy-storage boxes used in household energy-storage scenarios, which may mainly operate in a "peak shaving and valley filling" mode. Since there is a significant price difference in electricity costs between peak and off-peak periods according to electricity demand, in a case where users have energy-storage devices, the users can typically charge the energy-storage cabinet/box during off-peak periods to reduce costs. During peak electricity price periods, the users can discharge the electricity stored in the energy-storage device for use to lower electricity costs. Additionally, in remote areas and regions prone to natural disasters such as earthquakes and hurricanes, the household energy-storage devices 100 can serve as a standby power supply for users and the power grid, eliminating the inconvenience caused by frequent power outages due to disasters or other reasons.

Figure 2:
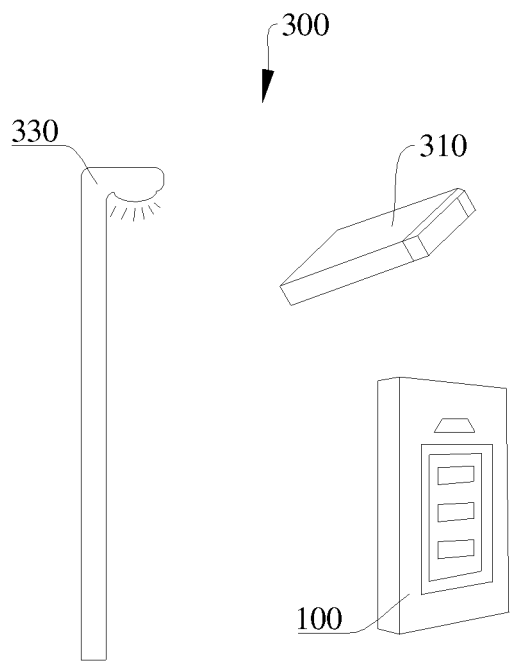
FIG. 2 is a schematic structural diagram of an energy-storage system according to an embodiment of the disclosure.
Figure 3:
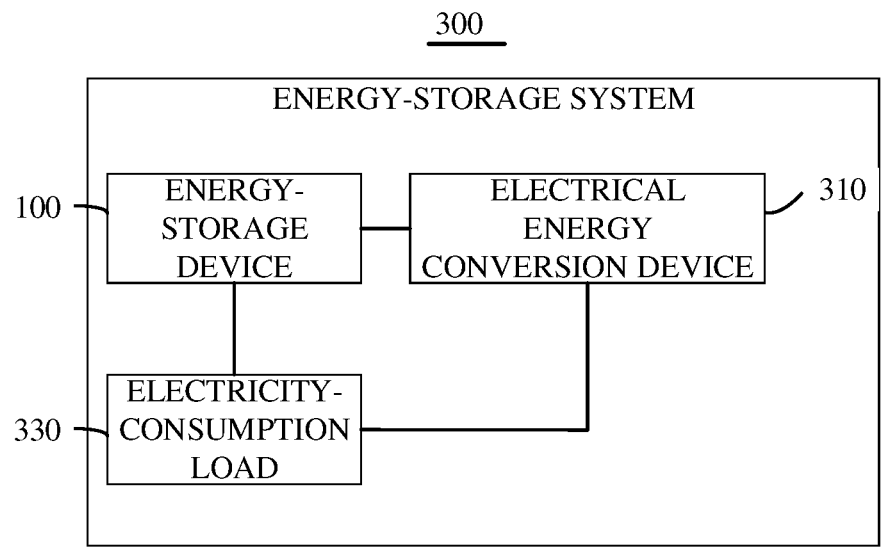
FIG. 3 is a circuit block diagram of an energy-storage system according to an embodiment of the disclosure.

FIG. 1 is a diagram of an application scenario of an energy-storage system 300 according to an embodiment of the disclosure. In the embodiment of FIG. 1 of the disclosure, a household energy-storage scenario in which energy is stored on a user side is taken as an example for illustration. An energy-storage device 100 of the disclosure is not limited to the household energy-storage scenario. FIG. 2 is a schematic structural diagram of an energy-storage system 300 according to an embodiment of the disclosure. FIG. 3 is a circuit block diagram of the energy-storage system 300 according to the embodiment of the disclosure. Referring to FIG. 1 to FIG. 3, the disclosure provides the energy-storage system 300. The energy-storage system 300 is a household energy-storage system 300. The energy-storage system 300 includes an electrical energy conversion device 310, the energy-storage device 100, and an electricity-consumption load 330. The electrical energy conversion device 310 is configured to convert energy other than electrical energy into electrical energy. The energy-storage device 100 is electrically connected to the electrical energy conversion device 310 and is configured to store electrical energy of the electrical energy conversion device 310. The electricity-consumption load 330 is electrically connected to the electrical energy conversion device 310 and the energy-storage device 100, and configured to operate by using the electrical energy of the electrical energy conversion device 310 or electrical energy of the energy-storage device 100. It may be understood that, part of the electrical energy converted by the electrical energy conversion device 310 can be stored in the energy-storage device 100, and the other part of the electrical energy converted by the electrical energy conversion device 310 can be used to power the electricity-consumption load 330. The energy-storage device 100 is configured to store electrical energy, and supply the electrical energy stored to the electricity-consumption load 330 during peak electricity price periods. The energy-storage system 300 can convert energy other than electrical energy into electrical energy, and can also store the electrical energy in the energy-storage device 100, thereby supplying sufficient electrical energy to the electricity-consumption load 330.

Optionally, the electrical energy conversion device 310 may convert at least one of solar energy, optical energy, wind energy, thermal energy, tidal energy, biomass energy, and mechanical energy into electrical energy, to provide a stable power supply for the electricity-consumption load 330 and the energy-storage device 100.

Optionally, the electrical energy conversion device 310 may be a photovoltaic panel. The photovoltaic panel may convert solar energy into electrical energy during off-peak electricity price periods, and store the electrical energy in the energy-storage device 100. In other embodiments, the electrical energy conversion device 310 may also be at least one of a wind energy power-generation device, a thermal energy power-generation device, a tidal energy power-generation device, a biomass energy power-generation device, and a mechanical energy power-generation device.

Optionally, the energy-storage device 100 may be a small-sized energy-storage box, and can be mounted on an outdoor wall by means of wall mounting. In other embodiments, the energy-storage device 100 may also be a large-sized energy-storage container, a battery applied to an electronic device, or the like.

Optionally, the electricity-consumption load 330 may be a street lamp, a household appliance, a motor vehicle, or the like. The energy-storage device 100 is configured to store the electrical energy, and to supply the electrical energy stored to the street lamp and the household appliance during peak electricity price periods, or to supply power during power outages, blackouts, or loss of electricity.

It may be understood that the energy-storage device 100 may include, but is not limited to, at least one of a battery cell, a battery module, a battery pack, a battery system, and the like. The battery cell may be, but not limited to, at least one of a cylindrical cell, a prismatic cell, and the like.

It may be understood that, the drawings in the embodiments are only schematic forms of the energy-storage system 300, and should not be construed as limitations to the energy-storage system 300 provided in the disclosure, nor should it be construed as limitations to the energy-storage device 100 provided in each embodiment of the disclosure.

Figure 4:
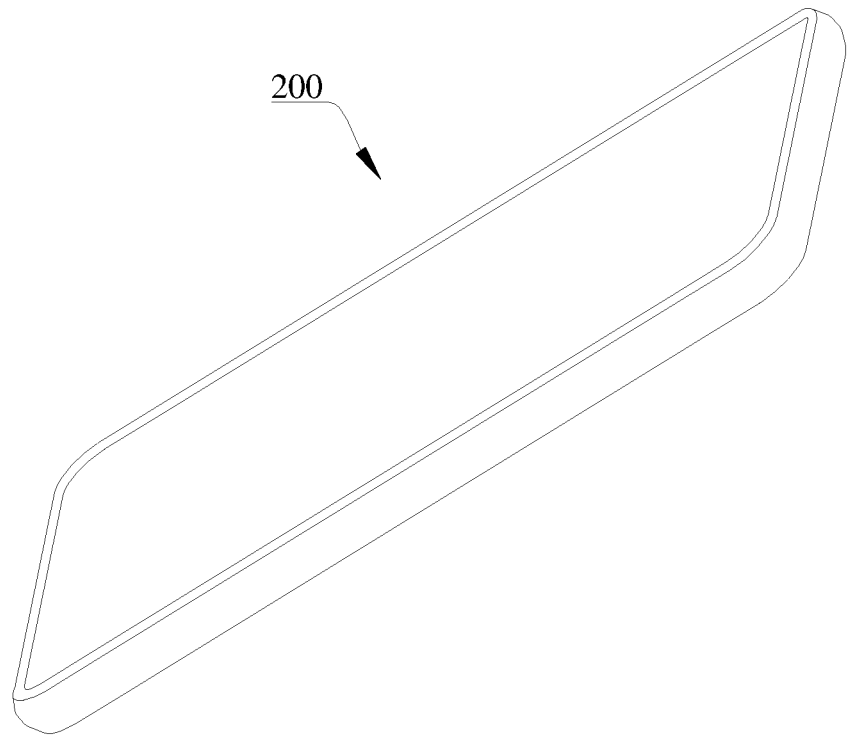
FIG. 4 is a schematic structural view of an electricity-consumption apparatus according to an embodiment of the disclosure.
Figure 5:
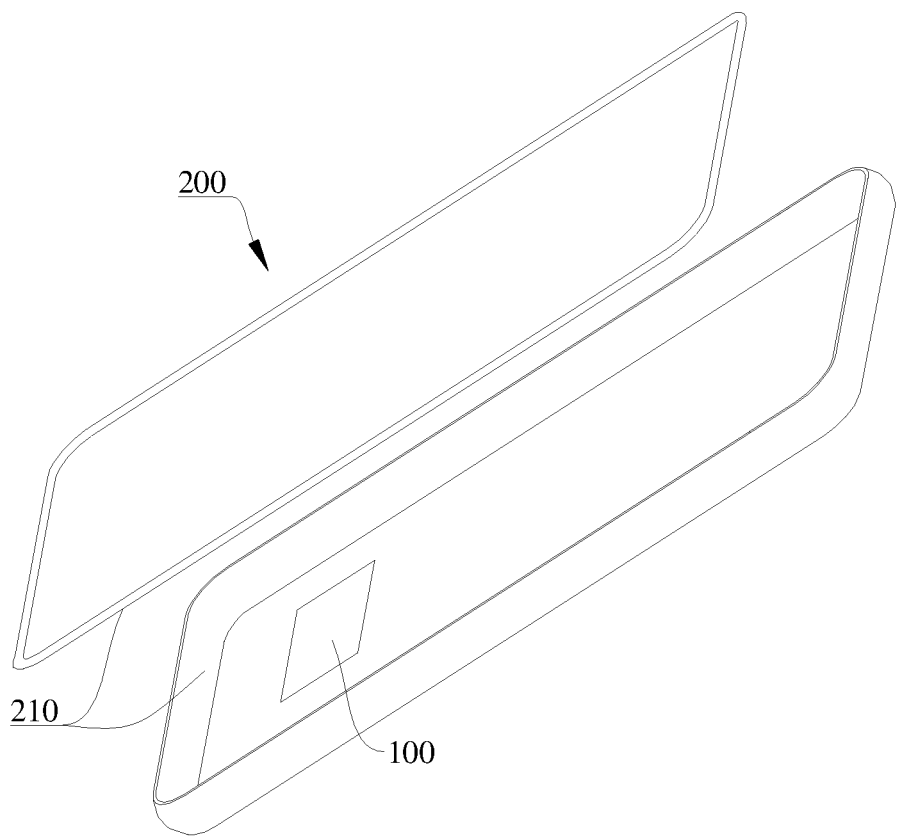
FIG. 5 is a partial exploded schematic structural view of an electricity-consumption apparatus according to an embodiment of the disclosure.

Referring to FIGS. 4 and 5, FIG. 4 is a schematic structural view of an electricity-consumption apparatus 210 according to an embodiment of the disclosure, and FIG. 5 is a partial exploded schematic structural view of an electricity-consumption apparatus 210 according to an embodiment of the disclosure. The embodiments of the disclosure further provide an electricity-consumption system 200. The electricity-consumption system 200 includes the electricity-consumption apparatus 210 and the energy-storage device 100. The energy-storage device 100 is configured to power the electricity-consumption apparatus 210.

The electricity-consumption apparatus 210 in the embodiments of the disclosure may be, but is not limited to, a portable electronic device such as a mobile phone, a tablet computer, a notebook computer, a desktop computer, a smart bracelet, a smart watch, an e-reader, and a game machine. The electricity-consumption apparatus 210 in the embodiments of the disclosure may also be a vehicle such as an automobile, a truck, a car, a van, a D-series high-speed train, a high-speed train, an electric bicycle, etc. In addition, the electricity-consumption apparatus 210 in the embodiments of the disclosure may also be household appliances such as refrigerators, electric lights, air conditioners, etc. It may be understood that the electricity-consumption apparatus 210 illustrated in the drawings of the disclosure is merely one form of the electricity-consumption apparatus 210, and should not be understood as limitations to the electricity-consumption apparatus 210 provided in the disclosure.

Within the energy-storage device, multiple energy-storage units (such as multiple battery units) are usually arranged. The multiple energy-storage units are electrically connected through electrical connectors such as aluminum bars. The multiple energy-storage units are electrically connected to a battery management unit through a wire harness, so that parameters (such as a voltage parameter and a temperature parameter) of the energy-storage units can be collected. When thermal runaway occurs in some of the multiple energy-storage units, causing the explosion-proof valve to burst and release a large amount of high-temperature high-pressure flammable gas, the high-temperature gas can rapidly and irregularly spread to fill the entire internal space of the energy-storage device. The high-temperature flammable gas can easily melt an insulation layer on a surface of the wire harness, the electrical connector, etc., leading to insulation failure or short circuit of the wire harness or the electrical connector. It is easy to cause the spread of thermal runaway and the expansion of the thermal runaway range, leading to sparking and ignition, thereby reducing the safety of the energy-storage device.

Figure 6:
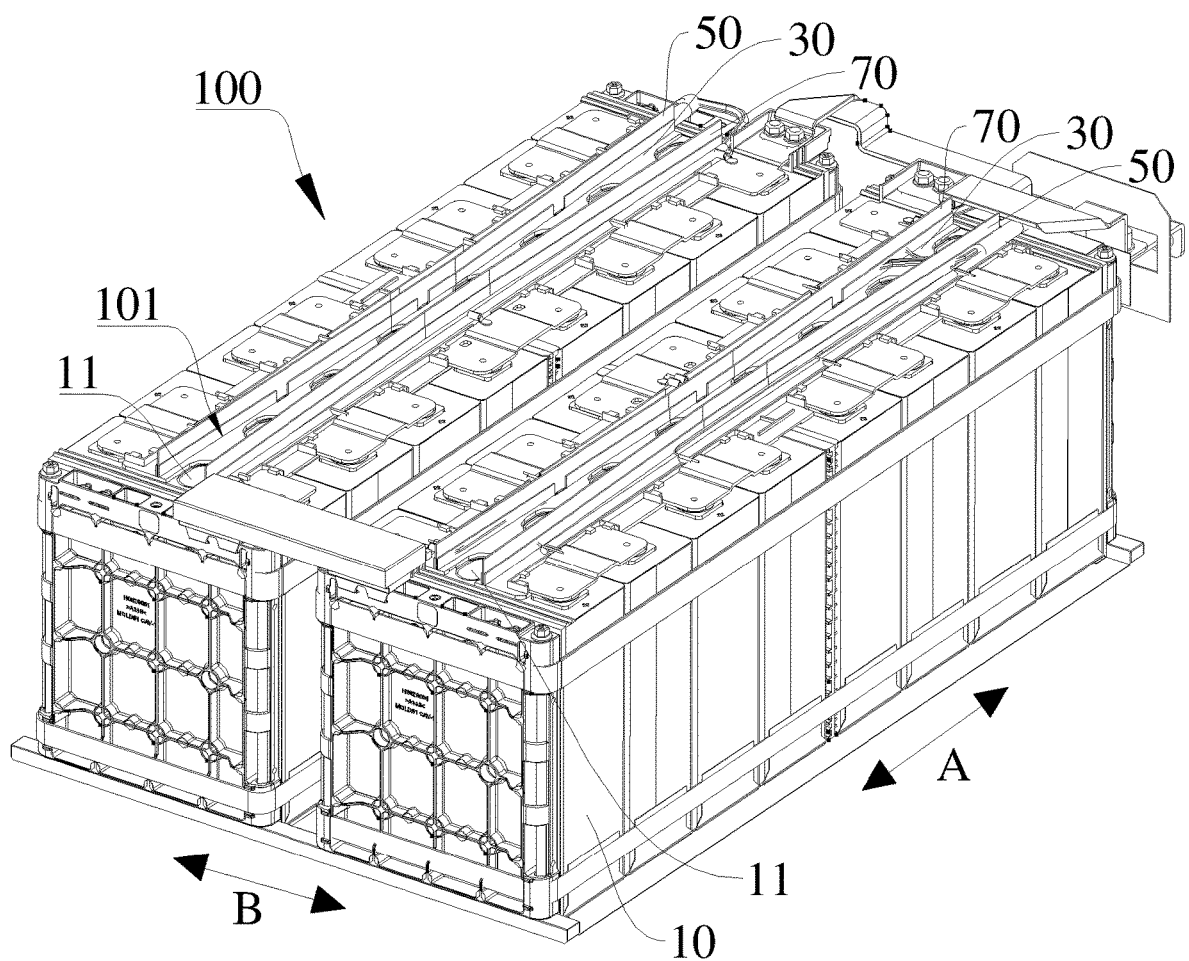
FIG. 6 is a schematic structural view of an energy-storage device according to an embodiment of the disclosure.
Figure 7:
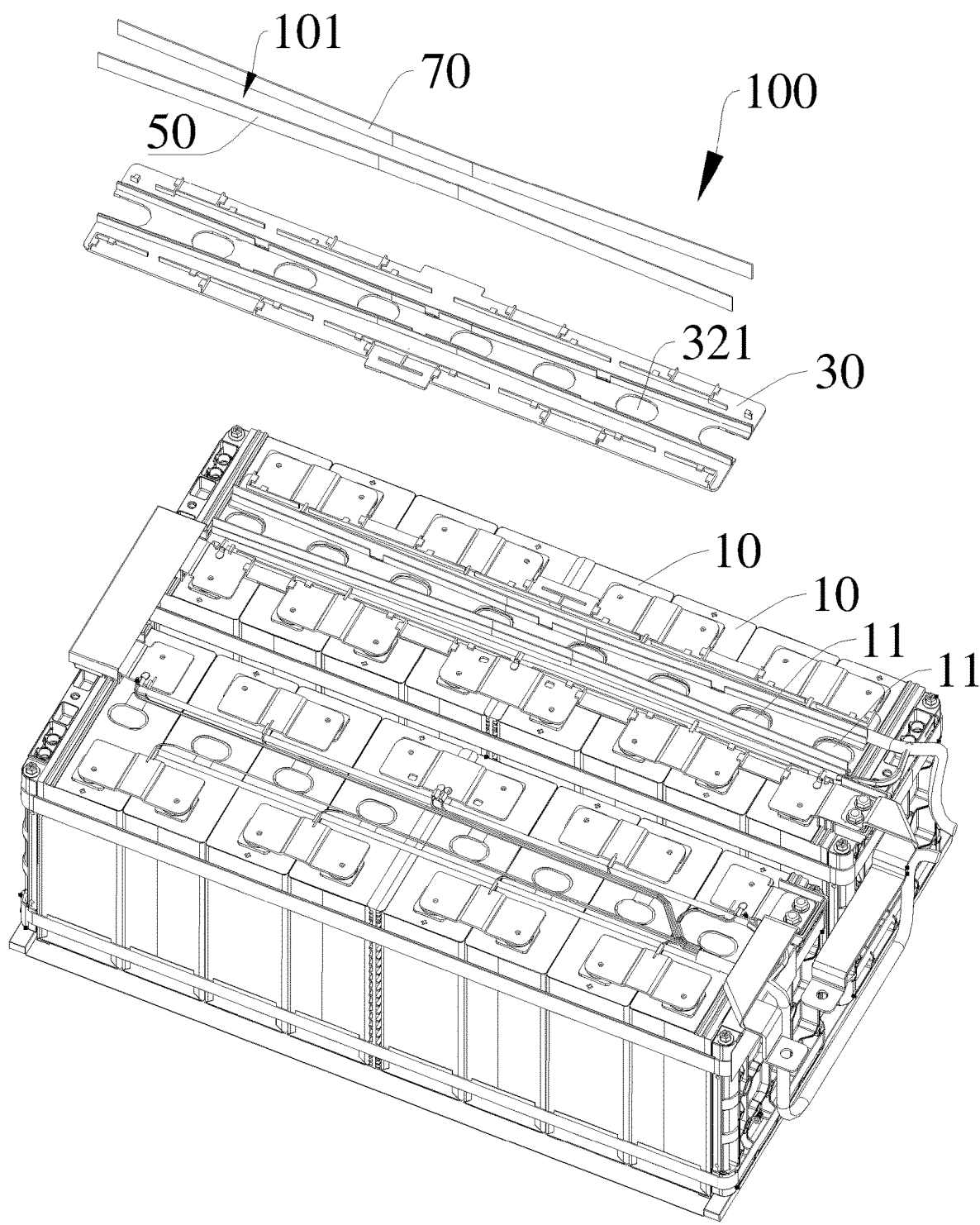
FIG. 7 is a partial exploded schematic structural view of an energy-storage device according to an embodiment of the disclosure.

Referring to FIGS. 6 and 7, FIG. 6 is a schematic structural view of an energy-storage device 100 according to an embodiment of the disclosure, and FIG. 7 is a partial exploded schematic structural view of an energy-storage device 100 according to an embodiment of the disclosure. The energy-storage device 100 is further provided in the embodiments of the disclosure. The energy-storage device 100 includes multiple energy-storage units 10, an isolation plate 30, a first thermal insulator 50, and a second thermal insulator 70. The multiple energy-storage units 10 are sequentially arranged in a first direction (as illustrated by double-headed arrow A in FIG. 6). Each of the multiple energy-storage units 10 includes an explosion-proof valve 11. The isolation plate 30 is located at one side of each of the multiple energy-storage units 10 where the explosion-proof valve 11 is located, extends in the first direction, and defines multiple vents 321 arranged at intervals in the first direction. Each of the multiple vents 321 is at least partially aligned with a corresponding explosion-proof valve 11. Different explosion-proof valves 11 are aligned with different multiple vents 321. The first thermal insulator 50 and the second thermal insulator 70 are both located at one side of the isolation plate 30 away from the multiple energy-storage units 10. The first thermal insulator 50 and the second thermal insulator 70 are spaced apart from each other in a second direction (as illustrated by double-headed arrow B in FIG. 6) at two opposite sides of each of the multiple explosion-proof valve 11. The first thermal insulator 50, the second thermal insulator 70, and the isolation plate 30 cooperatively define a guide channel 101, two opposite ends of the guide channel 101 are both in communication with an external environment and a space in which each of the multiple explosion-proof valves 11 faces the isolation plate 30, and the first direction intersects the second direction.

In some embodiments, for each of the multiple vents 321, an orthographic projection of the vent 321 on the energy-storage unit 10 facing the vent 321 is at least partially overlapped with a corresponding explosion-proof valve 11.

Optionally, the energy-storage unit 10 may be applied to, but not limited to, an energy-storage unit such as a lithium-ion secondary battery, a lithium-ion primary battery, a lithium-sulfur battery, a sodium lithium-ion battery, a sodium-ion battery, a magnesium-ion battery, or an energy-storage battery. It may be understood that the energy-storage unit 10 illustrated in the drawings of the disclosure is merely one form of the energy-storage unit 10, and should not be construed as limitations to the energy-storage unit 10 provided in the disclosure.

Optionally, the explosion-proof valves 11 of the multiple energy-storage units 10 all face towards a same side. In other words, the explosion-proof valves 11 of the multiple energy-storage units 10 all face towards a same side. In yet other words, the explosion-proof valve 11 of each of the multiple energy-storage units 10 is located on a face of the multiple energy-storage unit 10 at the same side as the explosion-proof valve 11 of another energy-storage unit 10.

It may be noted that, each vent 321 is at least partially aligned with a corresponding one explosion-proof valve 11. The multiple explosion-proof valves 11 are in one-to-one correspondence with the multiple vents 321. It may be understood that, an orthographic projection of each of the explosion-proof valves 11 on a surface, which faces the energy-storage units 10, of the isolation plate 30 is at least partially overlapped with an orthographic projection of a corresponding one vent 321 on the surface, which faces the energy-storage units 10, of the isolation plate 30. Orthographic projections of the explosion-proof valves 11 on the surface, which faces the energy-storage units 10, of the isolation plate 30 are in one-to-one correspondence with and at least partially overlapped with orthographic projections of the vents 321 on the surface, which faces the energy-storage units 10, of the isolation plate 30. In an embodiment, the orthographic projection of each of the explosion-proof valves 11 on the surface, facing the energy-storage unit 10, of the isolation plate 30 coincides with the orthographic projection of one vent 321 on the surface, facing the energy-storage unit 10, of the isolation plate 30.

Each of the vents 321 is at least partially aligned with a corresponding explosion-proof valve 11, and different explosion-proof valves 11 are aligned with different vents 321. It may also be understood that each of the vents 321 is in communication with a space in which a corresponding explosion-proof valve 11 faces the isolation plate 30, spaces in which different explosion-proof valves 11 face the isolation plate 30 are in communication with different vents 321, and the vents 321 are in one-to-one correspondence with the explosion-proof valves 11. In an embodiment, each of the vents 321 is in communication with a space between a corresponding explosion-proof valve 11 and the isolation plate 30, spaces between different explosion-proof valves 11 and the isolation plate 30 are in communication with different vents 321, and the vents 321 are in one-to-one correspondence with the explosion-proof valves 11.

It may be noted that the first thermal insulator 50 and the second thermal insulator 70 both extend in the first direction.

It may be noted that, the space in which the explosion-proof valve 11 faces the isolation plate 30 (i.e., a space between the explosion-proof valve 11 and the isolation plate 30) may be in communication with the external environment through the guide channel 101.

"External environment" refers to an environment outside the energy-storage device.

Alternatively, the first direction is perpendicular to the second direction.

In the energy-storage device 100 of the embodiments of the disclosure, the first thermal insulator 50 and the second thermal insulator 70 are arranged at two opposite sides of each of the multiple explosion-proof valves 11 of the energy-storage unit 10. The first thermal insulator 50, the second thermal insulator 70, and the isolation plate 30 cooperatively define the guide channel 101. The two opposite ends of the guide channel 101 are both in communication with the external environment and the space in which each of the multiple explosion-proof valves 11 faces the isolation plate 30. If thermal runaway occurs in some of the energy-storage units 10 of the energy-storage device 100, the explosion-proof valves 11 of these energy-storage units 10 will burst, a large amount of high-temperature and high-pressure flammable gases will instantaneously be generated within the energy-storage unit 10 and rush out through the explosion-proof valves 11. Due to the presence of the guide channel 101, the high-temperature gas can be guided to the outside of the energy-storage device 100 through the guide channel 101, thereby preventing the high-temperature gas from irregularly dispersing within the energy-storage device 100 to fill the entire space of the energy-storage device 100. This helps to avoid melt of insulation layers on surfaces of wire harnesses, electrical connectors (such as copper bars), etc. that are connected to each energy-storage unit 10 in the energy-storage device 100, thereby preventing insulation failure or short circuits of the wire harnesses or electrical connectors, exacerbation of the spread of thermal runaway, even sparking and ignition of the energy-storage device 100, and expansion of the thermal runaway range. Consequently, in the embodiments of the disclosure, the energy-storage device 100 can more efficiently prevent the spread and expansion of thermal runaway when thermal runaway occurs in some of the energy-storage units 10, thereby improving the safety of the energy-storage device 100.

Figure 8:
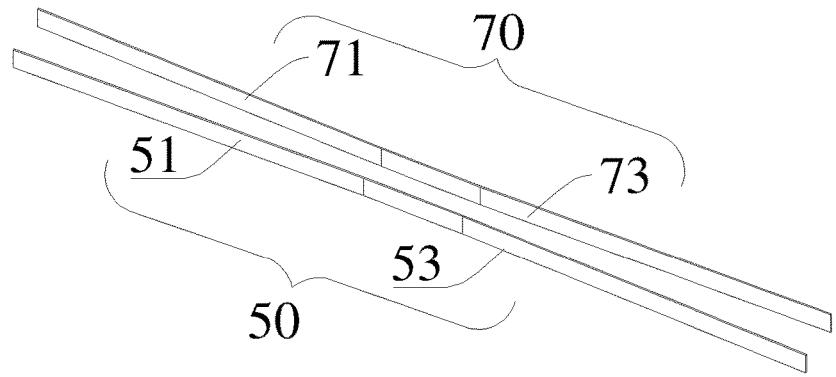
FIG. 8 is a schematic structural view of a first thermal insulator and a second thermal insulator according to an embodiment of the disclosure.

Referring to FIG. 8, FIG. 8 is a schematic structural view of the first thermal insulator 50 and the second thermal insulator 70 according to an embodiment of the disclosure. In some embodiments, the first thermal insulator 50 includes a first thermal insulation portion 51 and a second thermal insulation portion 53 that are connected to each other and arranged in the first direction. The second thermal insulator 70 includes a third thermal insulation portion 71 and a fourth thermal insulation portion 73 that are connected to each other and arranged in the first direction. The first thermal insulation portion 51 faces the third thermal insulation portion 71. A distance between the first thermal insulation portion 51 and the third thermal insulation portion 71 gradually increases in a direction from one end of the first thermal insulation portion 51 close to the second thermal insulation portion 53 and one end of the third thermal insulation portion 71 close to the fourth thermal insulation portion 73 to another end of the first thermal insulation portion 51 away from the second thermal insulation portion 53 and another end of the third thermal insulation portion 71 away from the fourth thermal insulation portion 73. The second thermal insulation portion 53 faces the fourth thermal insulation portion 73, and a distance between the second thermal insulation portion 53 and the fourth thermal insulation portion 73 gradually increases in a direction from one end of the second thermal insulation portion 53 close to the first thermal insulation portion 51 and one end of the fourth thermal insulation portion 73 close to the third thermal insulation portion 71 to another end of the second thermal insulation portion 53 away from the first thermal insulation portion 51 and another end of the fourth thermal insulation portion 73 away from the third thermal insulation portion 71.

In some embodiments, the distance between the first thermal insulation portion 51 and the third thermal insulation portion 71 gradually increases in a direction away from the second thermal insulation portion 53 and the fourth thermal insulation portion 73. In some embodiments, the distance between the second thermal insulation portion 53 and the fourth thermal insulation portion 73 gradually increases in a direction away from the first thermal insulation portion 51 and the third thermal insulation portion 71.

It may be understood that, the first thermal insulation portion 51 and the third thermal insulation portion 71 are arranged in the second direction. The first thermal insulation portion 51 may be integrally formed with the third thermal insulation portion 71. The first thermal insulation portion 51 and the third thermal insulation portion 71 serve as two different parts of the first thermal insulator 50. The second thermal insulation portion 53 and the fourth thermal insulation portion 73 are also arranged in the second direction. The second thermal insulation portion 53 may be integrally formed with the fourth thermal insulation portion 73. The second thermal insulation portion 53 and the fourth thermal insulation portion 73 serve as two different parts of the second thermal insulator 70.

It may be understood that, a distance between the first thermal insulator 50 and the second thermal insulator 70 gradually increases in a direction from a portion of the first thermal insulator 50 close to the middle of the first thermal insulator 50 and a portion of the second thermal insulator 70 close to the middle of the second thermal insulator 70 to a portion of the first thermal insulator 50 close to two terminals of the first thermal insulator 50 and a portion of the second thermal insulator 70 close to two terminals of the second thermal insulator 70. In other words, a distance between a portion of the first thermal insulator 50 close to the middle of the first thermal insulator 50 and a portion of the second thermal insulator 70 close to the middle of the second thermal insulator 70 is less than a distance between a portion of the first thermal insulator 50 close to two terminals of the first thermal insulator 50 and a portion of the second thermal insulator 70 close to two terminals of the second thermal insulator 70. In some embodiments, the distance between the first thermal insulator 50 and the second thermal insulator 70 gradually increases in a direction from the middle of the first thermal insulator 50 and the second thermal insulator 70 to each of two opposite ends of the first thermal insulator 50 and the second thermal insulator 70.

It may also be understood that, a width of the guide channel 101 gradually increases in a direction from a position where the first thermal insulation portion 51 is connected to the second thermal insulation portion 53 (or a position where the third thermal insulation portion 71 is connected to the fourth thermal insulation portion 73) to two opposite ends of the guide channel 101. In other words, the width of the guide channel 101 gradually increases in a direction from the middle of the guide channel 101 to two opposite ends of the guide channel 101.

It may be understood that, the first thermal insulation portion 51 and the third thermal insulation portion 71 may be configured in a bell-mouth shape, and the second thermal insulation portion 53 and the fourth thermal insulation portion 73 may be configured in a bell-mouth shape. In other words, the first thermal insulator 50 and the second thermal insulator 70 are configured in a bidirectional bell-mouth shape. In yet other words, the first thermal insulator 50 and the second thermal insulator 70 form an opposing bell-mouth structure.

In the embodiments, the first thermal insulation portion 51 and the third thermal insulation portion 71 may be configured in a bell-mouth shape, and the second thermal insulation portion 53 and the fourth thermal insulation portion 73 may be configured in a bell-mouth shape, thereby forming a bidirectional bell-mouth shape. When thermal runaway occurs in some of the energy-storage units 10 in the energy-storage device 100, the explosion-proof valves 11 will burst and release a large amount of high-temperature and high-pressure flammable gases, the high-temperature flammable gases can be more efficiently discharged towards both sides to the outside of the energy-storage device 100 (i.e., the external environment) along the guide channel 101. This enhances the speed of discharging the high-temperature flammable gases from the energy-storage device 100, so that the high-temperature flammable gases can be discharged smoother and the spread of thermal runaway can be further avoided, thereby improving the safety of the energy-storage device 100.

Figure 9:
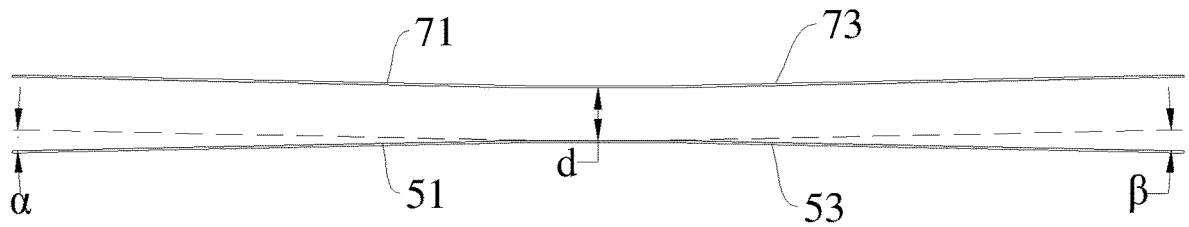
FIG. 9 is a top view of the first thermal insulator and the second thermal insulator in FIG. 8 of the disclosure.

FIG. 9 is a top view of the first thermal insulator 50 and the second thermal insulator 70 in FIG. 8 of the disclosure. Alternatively, an angle α between the first thermal insulation portion 51 and the third thermal insulation portion 71 satisfies $5°≤α≤30°$. In other words, an angle α between a surface of the first thermal insulation portion 51 facing the third thermal insulation portion 71 and a surface of the third thermal insulation portion 71 facing the first thermal insulation portion 51 satisfies $5°≤α≤30°$. Specifically, the angle α between the first thermal insulation portion 51 and the third thermal insulation portion 71 may be, but is not limited to, 5°, 8°, 10°, 13°, 15°, 18°, 20°, 23°, 25°, 28°, 30°, or the like. If the angle α between the first thermal insulation portion 51 and the third thermal insulation portion 71 is too small, the improvement in discharge speed of the high-temperature flammable gas will be limited when thermal runaway occurs. If the angle α between the first thermal insulation portion 51 and the third thermal insulation portion 71 is too large, it would hinder the arrangement of other components in the energy-storage device 100. In a case where the angle α between the first thermal insulation portion 51 and the third thermal insulation portion 71 satisfies $5°≤α≤30°$, the discharge speed of the high-temperature flammable gas can be increased when thermal runaway occurs, and a more compact arrangement of components in the energy-storage device 100 can be achieved, thereby improving the energy density of the energy-storage device 100.

In an embodiment, the surface of the first thermal insulation portion 51 facing the third thermal insulation portion 51 is flat, and the surface of the third thermal insulation portion 71 facing the first thermal insulation portion 51 is flat. An angle between the surface of the first thermal insulation portion 51 facing the third thermal insulation portion 71 and the surface of the third thermal insulation portion 71 facing the first thermal insulation portion 51 ranges from 5° to 30°.

In another embodiment, the surface of the first thermal insulation portion 51 facing the third thermal insulation portion 71 is curved, and the surface of the third thermal insulation portion 71 facing the first thermal insulation portion 51 is curved. An angle between the surface of the first thermal insulation portion 51 facing the third thermal insulation portion 51 and the surface of the third thermal insulation portion 71 facing the first thermal insulation portion 51 ranges from 5° to 30°. The angle, between the surface of the first thermal insulation portion 51 facing the third thermal insulation portion 51 and the surface of the third thermal insulation portion 71 facing the first thermal insulation portion 51, gradually increases in a direction from one end of the first thermal insulation portion 51 close to the second thermal insulation portion 53 and one end of the third thermal insulation portion 71 close to the fourth thermal insulation portion 73 to another end of the first thermal insulation portion 51 away from the second thermal insulation portion 53 and another end of the third thermal insulation portion 71 away from the fourth thermal insulation portion 73, and for example, gradually increases from 8° to 20°.

Optionally, an angle β between the second thermal insulation portion 53 and the fourth thermal insulation portion 73 satisfies 5°≤β≤30°. In other words, the angle β between a surface of the second thermal insulation portion 53 facing the fourth thermal insulation portion 73 and a surface of the fourth thermal insulation portion 73 facing the second thermal insulation portion 53 satisfies 5°≤β≤30°. Specifically, the angle β between the second thermal insulation portion 53 and the fourth thermal insulation portion 73 may be, but not limited to, 5°, 8°, 10°, 13°, 15°, 18°, 20°, 23°, 25°, 28°, 30°, or the like. If the angle β between the second thermal insulation portion 53 and the fourth thermal insulation portion 73 is too small, the improvement in discharge speed of the high-temperature flammable gas will be limited when thermal runaway occurs. If the angle β between the second thermal insulation portion 53 and the fourth thermal insulation portion 73 is too large, it would hinder the arrangement of other components in the energy-storage device 100. In a case where the angle ẞ between the second thermal insulation portion 53 and the fourth thermal insulation portion 73 satisfies 5°≤β≤30°, the discharge speed of the high-temperature flammable gas can be increased when thermal runaway occurs, and a more compact arrangement of components in the energy-storage device 100 can be achieved, thereby improving the energy density of the energy-storage device 100.

In an embodiment, the surface of the second thermal insulation portion 53 facing the fourth thermal insulation portion 73 is flat, the surface of the fourth thermal insulation portion 73 facing the second thermal insulation portion 53 is flat. An angle between the surface of the second thermal insulation portion 53 facing the fourth thermal insulation portion 73 and the surface of the fourth thermal insulation portion 73 facing the second thermal insulation portion 53 ranges from 5° to 30°.

In another embodiment, the surface of the second thermal insulation portion 53 facing the fourth thermal insulation portion 73 is curved, and the surface of the fourth thermal insulation portion 73 facing the second thermal insulation portion 53 is curved. An angle between the surface of the second thermal insulation portion 53 facing the fourth thermal insulator 73 and the surface of the fourth thermal insulator 73 facing the second thermal insulation portion 53 ranges from 5° to 30°. The angle, between the surface of the second thermal insulation portion 53 facing the fourth thermal insulator 73 and the surface of the fourth thermal insulator 73 facing the second thermal insulation portion 53, gradually increases in a direction from one end of the second thermal insulation portion 53 close to the first thermal insulation portion 51 and one end of the fourth thermal insulator 73 close to the third thermal insulation portion 71 to another end of the second thermal insulation portion 53 away from the first thermal insulation portion 51 and another end of the fourth thermal insulator 73 away from the third thermal insulation portion 71, and for example, gradually increases from 8° to 20°.

Optionally, a minimum distance between the first thermal insulator 50 and the second thermal insulator 70 is greater than a minimum length of the explosion-proof valve 11 in the second direction. In an embodiment, a minimum distance between the first thermal insulator 50 and the second thermal insulator 70 is greater than a maximum length of the explosion-proof valve 11 in the second direction. In this way, when thermal runaway occurs in the energy-storage device 100 and the explosion-proof valve 11 bursts, it can efficiently ensure that all high-temperature and high-pressure flammable gases discharged through the explosion-proof valve 11 can enter the guide channel 101 without leaking to the outside of the guide channel 101.

Optionally, a minimum distance d between the first thermal insulator 50 and the second thermal insulator 70 satisfies 8 mm≤ d≤25 mm. Specifically, the minimum distance d between the first thermal insulator 50 and the second thermal insulator 70 may be, but is not limited to, 8 mm, 10 mm, 12 mm, 14 mm, 16 mm, 18 mm, 20 mm, 22 mm, 25 mm, etc. If the minimum distance between the first thermal insulator 50 and the second thermal insulator 70 is too small, the bursting of the explosion-proof valve 11 may be affected. If the minimum distance between the first thermal insulator 50 and the second thermal insulator 70 is too large, it would hinder the compact arrangement of components in the energy-storage device 100 and the improvement of the energy density of the energy-storage device 100.

Optionally, the first thermal insulator 50 may be, but is not limited to, at least one of a mica plate, a ceramic silicone rubber insulation plate, an aerogel insulation plate, and the like.

Optionally, the second thermal insulator 70 may be, but is not limited to, at least one of a mica plate, a ceramic silicone rubber insulation plate, an aerogel insulation plate, and the like.

Figure 10:
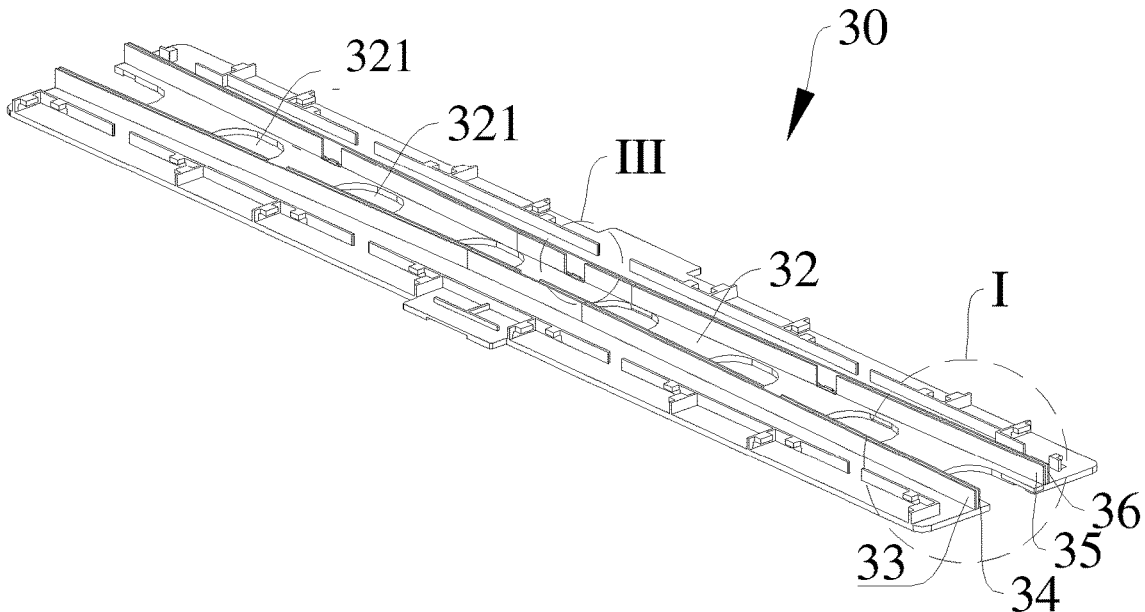
FIG. 10 is a schematic structural view of an isolation plate according to an embodiment of the disclosure.
Figure 11:
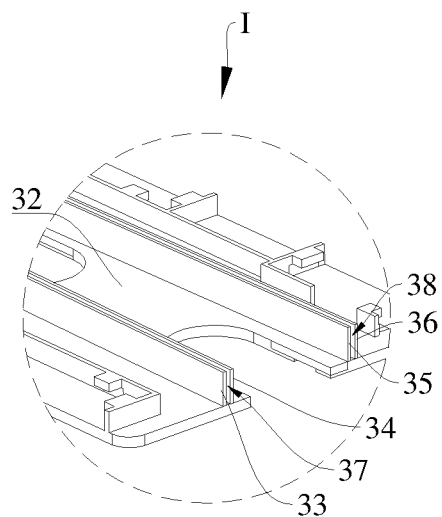
FIG. 11 is an enlarged view of dashed circle I in FIG. 10.

Referring to FIGS. 10 and 11, FIG. 10 is a schematic structural view of an isolation plate 30 according to an embodiment of the disclosure, and FIG. 11 is an enlarged view of dashed circle I in FIG. 10. In some embodiments, the isolation plate 30 includes a main body portion 32, a first mounting portion 33, a second mounting portion 34, a third mounting portion 35, and a fourth mounting portion 36. The main body portion 32 has multiple vents 321 arranged at intervals in a first direction. The first mounting portion 33, the second mounting portion 34, the third mounting portion 35, and the fourth mounting portion 36 are sequentially arranged at intervals in the second direction on a surface of the main body portion 32 away from the multiple energy-storage units 10. The first mounting portion 33 and the second mounting portion 34 are both arranged at one side of each of the multiple vents 321. The main body portion 32, the first mounting portion 33, and the second mounting portion 34 cooperatively define a first fitting groove 37. The first thermal insulator 50 is fitted with the first fitting groove 37. The third mounting portion 35 and the fourth mounting portion 36 are both arranged at one side of each of the multiple vents 321 away from the first mounting portion 33 and the second mounting portion 34. The main body portion 32, the third mounting portion 35, and the fourth mounting portion 36 cooperatively define a second fitting groove 38. The second thermal insulator 70 is fitted with the second fitting groove 38.

It may be understood that, the first mounting portion 33, the second mounting portion 34, the third mounting portion 35, and the fourth mounting portion 36 all extend in the first direction. The second mounting portion 34 and the third mounting portion 35 are arranged at two opposite sides of each of the multiple vents 321. The first mounting portion 33 is disposed at one side of the second mounting portion 34 away from the third mounting portion 35. The fourth mounting portion 36 is disposed at one side of the third mounting portion 35 away from the second mounting portion 34.

It may be understood that the main body portion 32, the first mounting portion 33, the second mounting portion 34, the third mounting portion 35, and the fourth mounting portion 36 are integrally formed. The main body portion 32, the first mounting portion 33, the second mounting portion 34, the third mounting portion 35, and the fourth mounting portion 36 serve as different parts of the isolation plate 30.

In the embodiments, the main body portion 32, the first mounting portion 33, and the second mounting portion 34 cooperate to more stably fix the first thermal insulator 50 to the isolation plate 30. The main body portion 32, the third mounting portion 35, and the fourth mounting portion 36 cooperate to more stably fix the second thermal insulator 70 to the isolation plate 30. In addition, the first thermal insulator 50 and the second thermal insulator 70 may also be fitted with the isolation plate 30 without a gap, so that when thermal runaway occurs in the energy-storage device 100, the high-temperature flammable gas can be more efficiently prevented from being discharged to one side of the first thermal insulator 50 away from the guide channel 101 or one side of the second thermal insulator 70 away from the guide channel 101.

Figure 12:
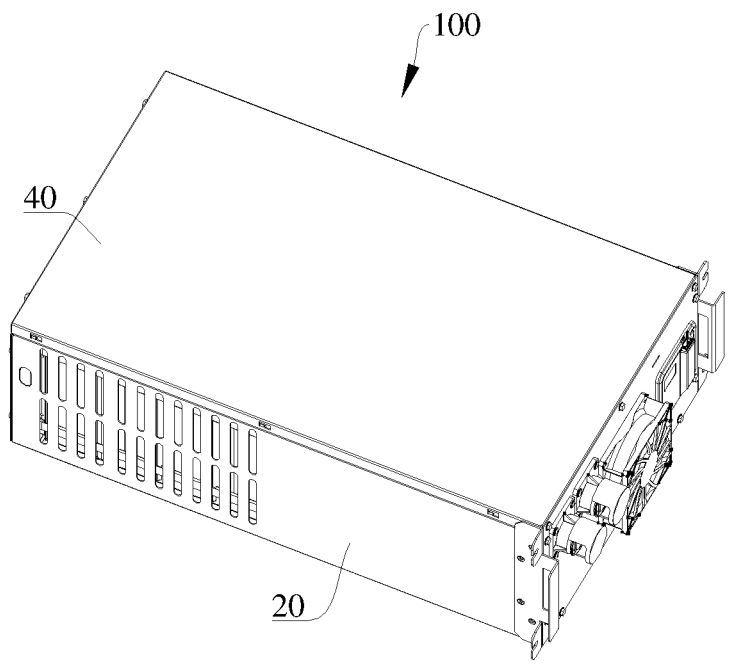
FIG. 12 is a schematic structural view of an energy-storage device according to another embodiment of the disclosure.
Figure 13:
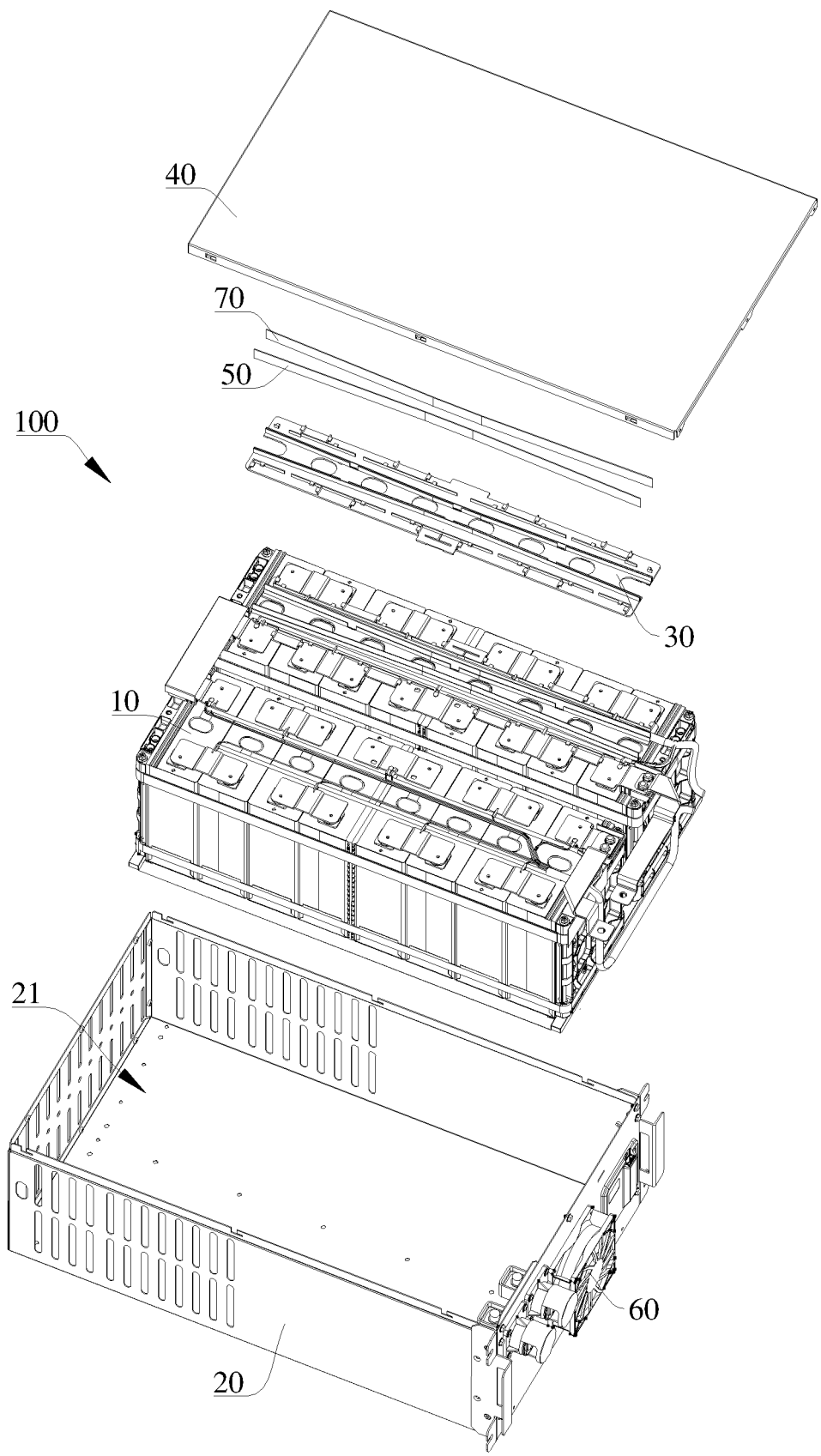
FIG. 13 is a partial exploded schematic structural view of an energy-storage device in FIG. 12 of the disclosure.
Figure 14:
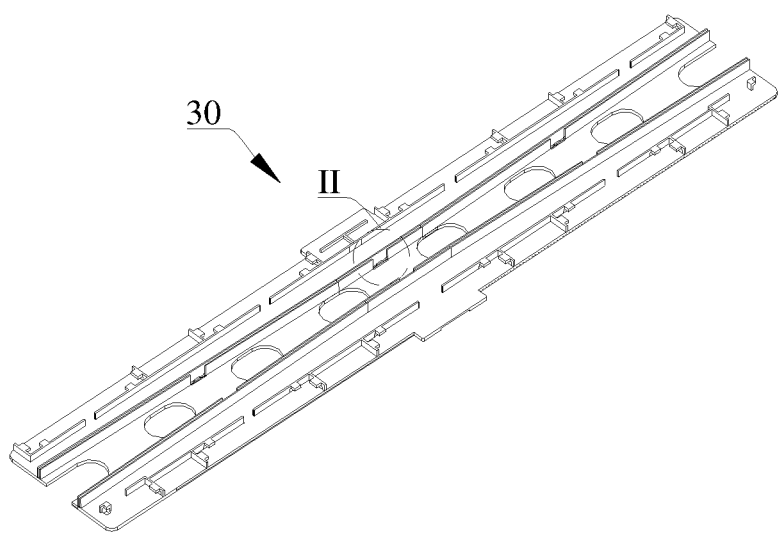
FIG. 14 is a schematic structural view of the isolation plate in FIG. 10, from another view.
Figure 15:
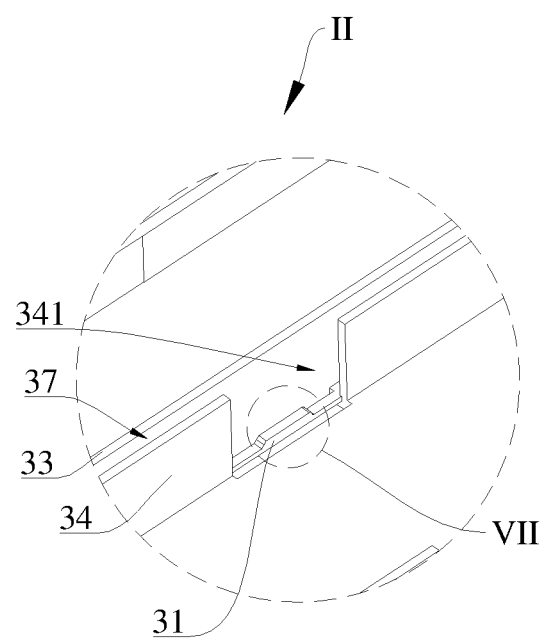
FIG. 15 is an enlarged view of dashed circle II in FIG. 14.
Figure 16:
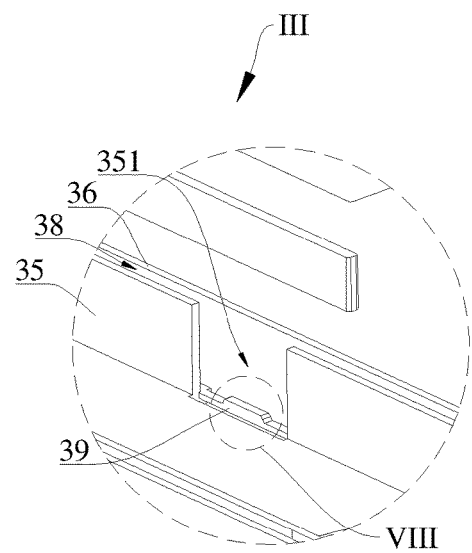
FIG. 16 is an enlarged view of dashed circle III in FIG. 10.

Referring to FIGS. 12 to 16, FIG. 12 is a schematic structural view of the energy-storage device 100 according to another embodiment of the disclosure, FIG. 13 is a partial exploded schematic structural view of the energy-storage device 100 in FIG. 12 of the disclosure, FIG. 14 is a schematic structural view of the isolation plate 30 in FIG. 10, from another view, FIG. 15 is an enlarged view of dashed circle II in FIG. 14, FIG. 16 is an enlarged view of dashed circle III in FIG. 10. In some embodiments, the energy-storage device 100 further includes a frame body 20 and a cover plate 40. The frame body 20 defines an accommodating groove 21 for receiving the multiple energy-storage units 10, the isolation plates 30, the first thermal insulator 50, and the second thermal insulator 70. The cover plate 40 seals the accommodating groove 21 and is fixed to the frame body 20. The isolation plate 30 further includes a first elastic portion 31 and a second elastic portion 39. The first elastic portion 31 and the second elastic portion 39 are both arranged on the surface of the main body portion 32 away from the multiple energy-storage units 10. At least part of the first elastic portion 31 is received in the first fitting groove 37 and abuts against the first thermal insulator 50, so that an end face of the first thermal insulator 50 away from the first elastic portion 31 is in tight contact with a surface of the cover plate 40 facing the accommodating groove 21. At least part of the second elastic portion 39 is received in the second fitting groove 38 and abuts against the second thermal insulator 70, so that an end face of the second thermal insulator 70 away from the second elastic portion 39 is in tight contact with the surface of the cover plate 40 facing the accommodating groove 21.

It may be understood that the main body portion 32, the first mounting portion 33, the second mounting portion 34, the third mounting portion 35, the fourth mounting portion 36, the first elastic portion 31, and the second elastic portion 39 are integrally formed. The main body portion 32, the first mounting portion 33, the second mounting portion 34, the third mounting portion 35, the fourth mounting portion 36, the first elastic portion 31, and the second elastic portion 39 serve as different parts of the isolation plate 30.

It may be understood that, the accommodating groove 21 defines an opening (not illustrated). The cover plate 40 is disposed at the opening of the accommodating groove 21 and is fixed to the frame body 20, so that components of the energy-storage device 100 such as the multiple energy-storage units 10, the isolation plates 30, the first thermal insulator 50, the second thermal insulator 70, and the like can be limited in the accommodating groove 21.

Figure 17:
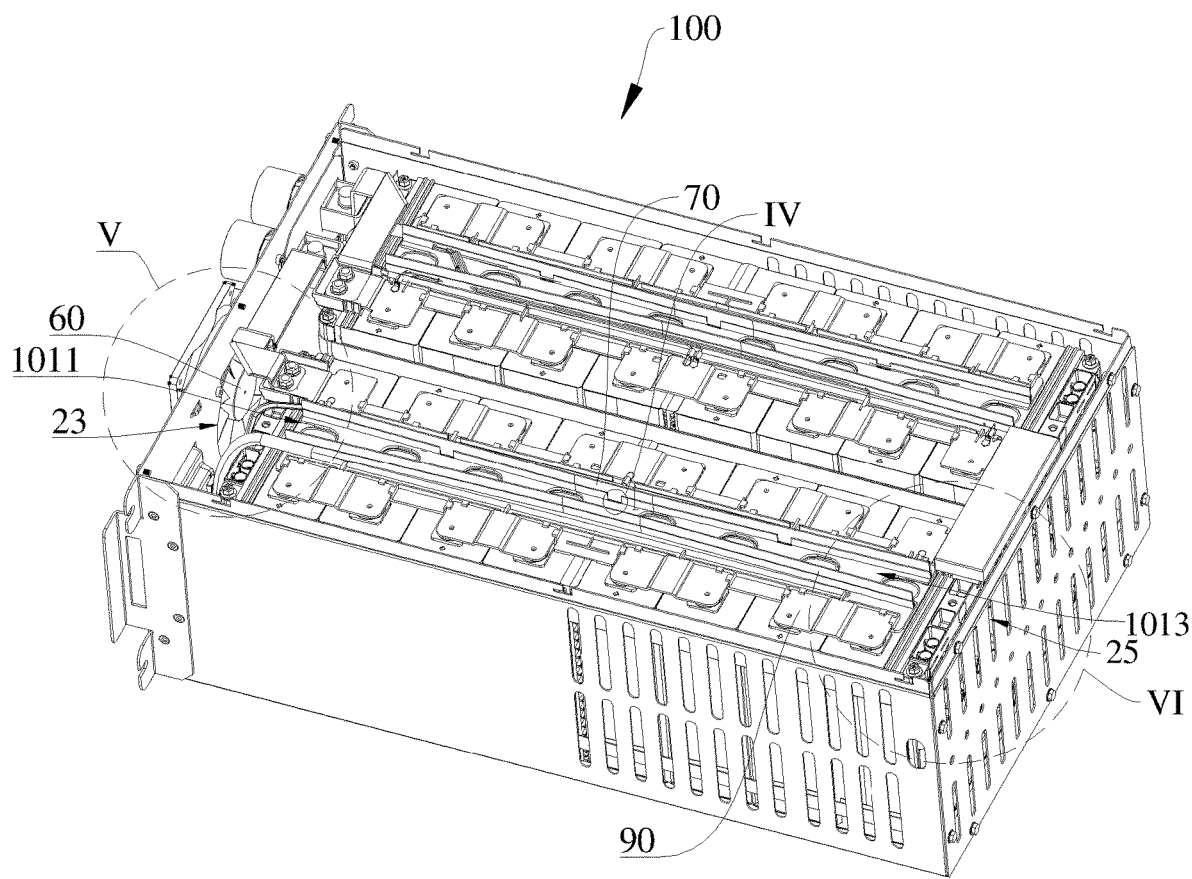
FIG. 17 is a schematic structural view of an energy-storage device according to another embodiment of the disclosure, where a cover plate is omitted.
Figure 18:
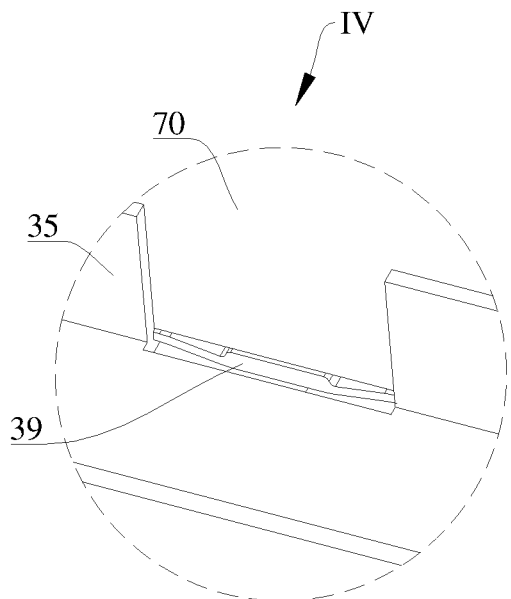
FIG. 18 is an enlarged view of dashed circle IV in FIG. 17.

In the embodiments, one end of the first thermal insulator 50 abuts against the first elastic portion 31, and another end of the first thermal insulator 50 abuts against the surface of the cover plate 40 facing the accommodating groove 21. Upon completion of the assembly of the first thermal insulator 50 and the cover plate 40, the first thermal insulator 50 compresses the first elastic portion 31 to deform. This results in an interference fit between the isolation plate 30, the first thermal insulator 50, and the cover plate 40. Thus, when thermal runaway occurs in the energy-storage device 100, it can more efficiently prevent the high-temperature and high-pressure flammable gas, discharged from the energy-storage device 100, from flowing to one side of the first thermal insulator 50 away from the guide channel 101, thereby preventing damage to an insulation layer on a surface of a wiring harness or an electrical connector at one side of the first thermal insulator 50 away from the guide channel 101. Similarly, one end of the second thermal insulator 70 abuts against the second elastic portion 39, and another end of the second thermal insulator 70 abuts against the surface of the cover plate 40 facing the accommodating groove 21. Upon completion of the assembly of the second thermal insulator 70 and the cover plate 40, the second thermal insulator 70 compresses the second elastic portion 39 to deform. In a case where completion of the assembly of the second thermal insulator 70, a fitting relationship between the second elastic portion 39 and the second thermal insulator 70 is illustrated in FIG. 17 and FIG. 18. FIG. 17 is a schematic structural view of an energy-storage device 100 according to another embodiment of the disclosure, where the cover plate 40 is omitted. FIG. 18 is an enlarged view of dashed circle IV in FIG. 17. This results in an interference fit between the isolation plate 30, the second thermal insulator 70, and the cover plate 40. Thus, when thermal runaway occurs, it can more efficiently prevent a high-temperature and high-pressure flammable gas, discharged from the energy-storage device 100, from flowing to one side of the second thermal insulator 70 away from the guide channel 101, thereby preventing damage to an insulation layer on a surface of a wiring harness or an electrical connector at one side of the second thermal insulator 70 away from the guide channel 101. In this way, when thermal runaway occurs in the energy-storage device 100, the spread of the thermal runaway can be prevented, sparking and ignition of the energy-storage device 100 can be prevented, thereby improving the safety of the energy-storage device 100.

As illustrated in FIG. 15, optionally, the second mounting portion 34 further defines a first notch 341. The first elastic portion 31 is further partially received in the first notch 341. This may facilitate an improvement in the mechanical strength of the first elastic portion 31.

As illustrated in FIG. 16, optionally, the third mounting portion 35 further defines a second notch 351. The second elastic portion 39 is further partially received in the second notch 351. This may facilitate an improvement in the mechanical strength of the second elastic portion 39.

Figure 19:
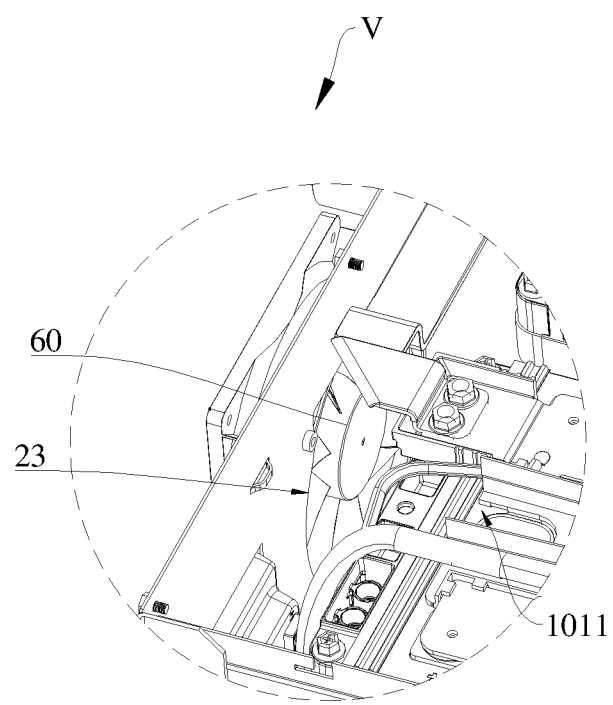
FIG. 19 is an enlarged view of dashed circle V in FIG. 17.
Figure 20:
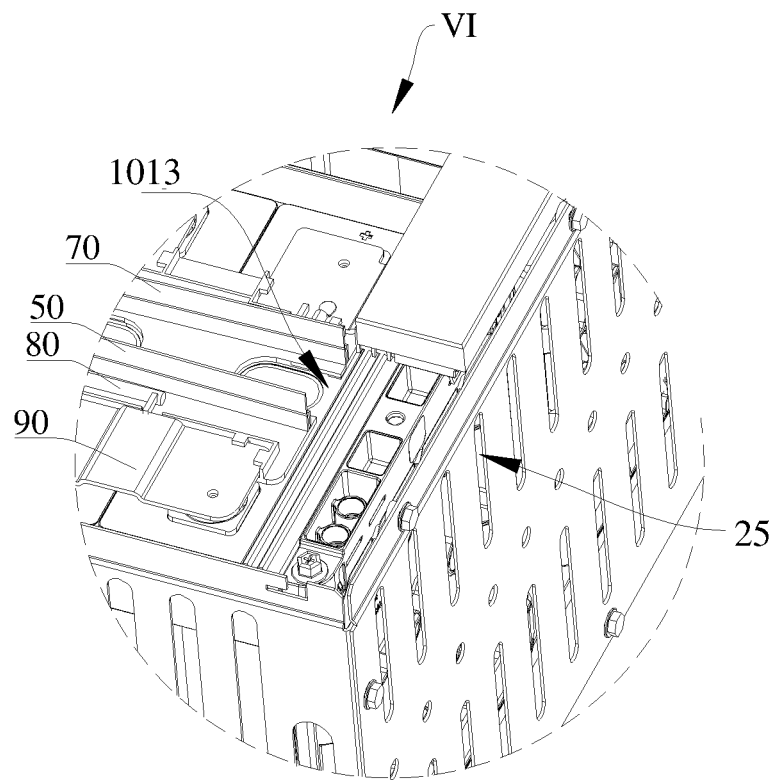
FIG. 20 is an enlarged view of dashed circle VI in FIG. 17.
Figure 21:
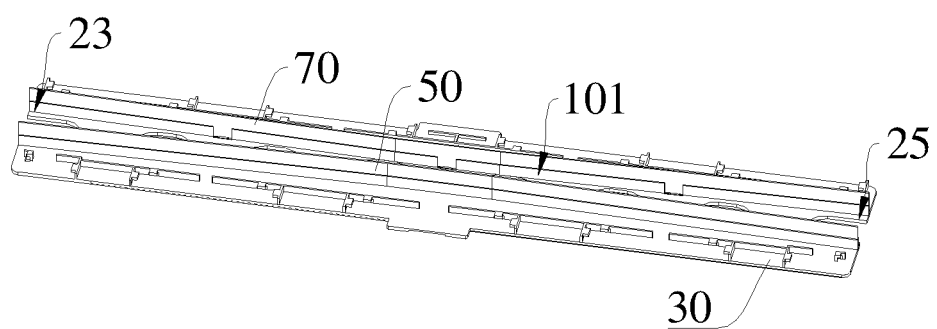
FIG. 21 is an assembly view of an isolation plate, a first thermal insulator, and a second thermal insulator according to the disclosure.

Referring to FIGS. 19 to 21, FIG. 19 is an enlarged view of dashed circle V in FIG. 17, FIG. 20 is an enlarged view of dashed circle VI in FIG. 17, and FIG. 21 is an assembly view of the isolation plate 30, the first thermal insulator 50, and the second thermal insulator 70 according to the disclosure.

Optionally, the guide channel 101 has a first guide opening 1011 and a second guide opening 1013 located at two opposite ends of the guide channel 101. The frame body 20 defines a first vent 23 and a second vent 25 opposite to the first vent 23 in the first direction. The first vent 23 is in communication with the first guide opening 1011. The second vent 25 is in communication with the second guide opening 1013. In this way, when thermal runaway occurs in the energy-storage device 100, the high-temperature flammable gas can be guided to the first guide opening 1011 and the second guide opening 1013 through the guide channel 101, and eventually discharged out of the energy-storage device 100 through the first vent 23 and the second vent 25.

In some embodiments, the energy-storage device 100 further includes an exhaust device 60 disposed in the first vent 23 and configured to exhaust gas in the guide channel 101 to the outside of the energy-storage device 100, so that when thermal runaway occurs in the energy-storage device 100, the high-temperature flammable gas in the guide channel 101 can be accelerated to be quickly discharged out of the energy-storage device 100.

Optionally, the exhaust device 60 may be, but is not limited to, a fan or a blower.

Figure 22:
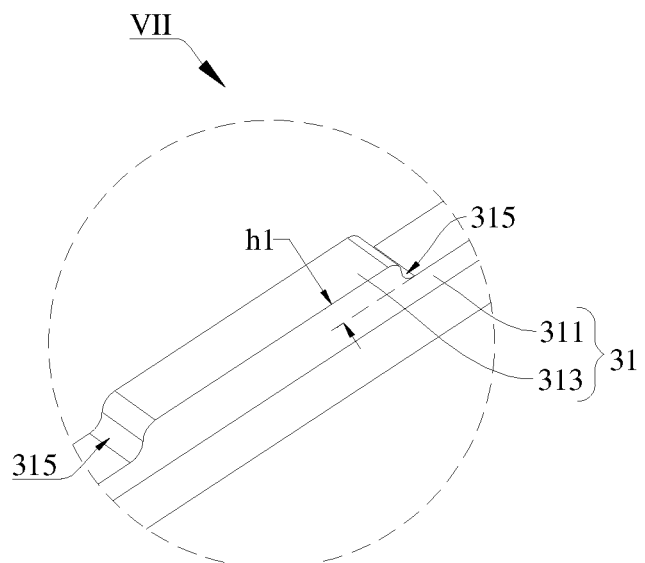
FIG. 22 is an enlarged view of dashed circle VII in FIG. 15.

Referring to FIG. 22, FIG. 22 is an enlarged view of dashed circle VII in FIG. 15. In some embodiments, the first elastic portion 31 includes a first support sub-portion 311 and a first protrusion sub-portion 313. The first support sub-portion 311 is connected to a surface of the main body portion 32 facing the first thermal insulator 50. The first protrusion sub-portion 313 protrudes from a surface of the first support sub-portion 311 away from the main body portion 32 and abuts against the first thermal insulator 50. A height h1 of the first protrusion sub-portions 313 satisfies 0.5 mm≤ h1≤1.5 mm in a direction from the first support sub-portion 311 to the first protrusion sub-portion 313. Specifically, the height h1 of the first protrusion sub-portions 313 may be, but is not limited to, 0.5 mm, 0.6 mm, 0.7 mm, 0.8 mm, 0.9 mm, 1.0 mm, 1.1 mm, 1.2 mm, 1.3 mm, 1.4 mm, 1.5 mm, and the like. If the height of the first protrusion sub-portion 313 is too small, it may be difficult to achieve interference fit between the first protrusion sub-portion 313, and the first thermal insulator 50 and the cover plate 40, thereby causing a gap between the first thermal insulator 50 and the cover plate 40. Therefore, when thermal runaway occurs in the energy-storage device 100, the high-temperature flammable gas may be discharged through the gap to one side of the first thermal insulator 50 away from the guide channel 101, thereby increasing the risk of spreading of thermal runaway, and reducing the safety of the energy-storage device 100. If the height of the first protrusion sub-portions 313 is too large, it may increase the difficulty of the assembly of the cover plate 40.

Optionally, the first support sub-portion 311 and the first protrusion sub-portion 313 are arranged in a third direction (not illustrated). The first direction, the second direction, and the third direction intersect with each other. In an embodiment, the first direction, the second direction, and the third direction are perpendicular to each other. The third direction is a direction in which the energy-storage unit 10, the isolation plate 30, and the first thermal insulator 50 (or the second thermal insulator 70) are stacked or arranged.

Optionally, in the first direction, two opposite ends of the first support sub-portion 311 both protrude from the first protrusion sub-portion 313.

Figure 23:
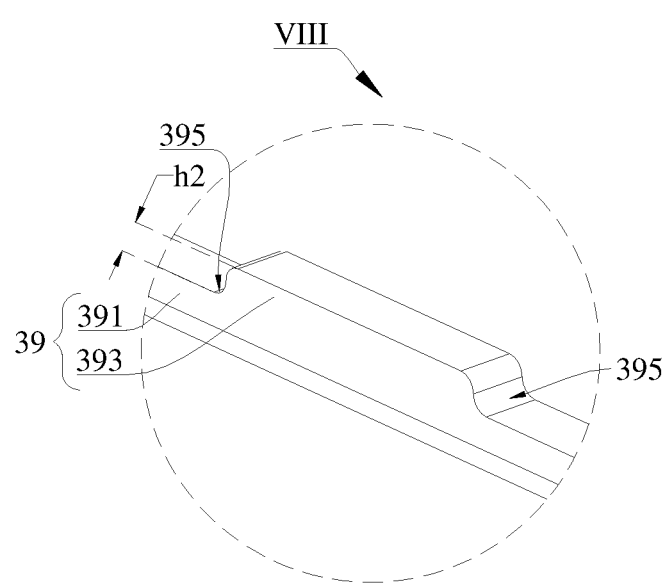
FIG. 23 is an enlarged view of dashed circle VIII in FIG. 16.

Referring to FIG. 23, FIG. 23 is an enlarged view of dashed circle VIII in FIG. 16. In some embodiments, the second elastic portion 39 includes a second support sub-portion 391 and a second protrusion sub-portion 393. The second support sub-portion 391 is connected to a surface of the main body portion 32 facing the second thermal insulator 70. The second protrusion sub-portion 393 protrudes from a surface of the second support sub-portion 391 away from the main body portion 32 and abuts against the second support sub-portion 391. A height h2 of the second protrusion sub-portion 393 satisfies 0.5 mm≤ h2≤1.5 mm in a direction from the second support sub-portion 391 to the second protrusion sub-portions 393. Specifically, the height h2 of the second protrusion sub-portion 393 may be, but not limited to, 0.5 mm, 0.6 mm, 0.7 mm, 0.8 mm, 0.9 mm, 1.0 mm, 1.1 mm, 1.2 mm, 1.3 mm, 1.4 mm, 1.5 mm, and the like. If the height of the second protrusion sub-portion 393 is too small, it may be difficult to achieve interference fit between the second protrusion sub-portion 393, and the second thermal insulator 70 and the cover plate 40, thereby causing a gap between the second thermal insulator 70 and the cover plate 40. Therefore, when thermal runaway occurs in the energy-storage device 100, the high-temperature flammable gas may be discharged through the gap to one side of the second thermal insulator 70 away from the guide channel 101, thereby increasing the risk of spreading of thermal runaway, and reducing the safety of the energy-storage device 100. If the height of the second protrusion sub-portion 393 is too large, it may increase the difficulty of the assembly of the cover plate 40.

Optionally, the second support sub-portion 391 and the second protrusion sub-portion 393 are arranged in the third direction. The first direction, the second direction, and the third direction intersect with each other. In an embodiment, the first direction, the second direction, and the third direction are perpendicular to each other. The third direction is a direction in which the energy-storage unit 10, the isolation plate 30, and the second thermal insulator 70 (or the first thermal insulator 50) are stacked or arranged.

Optionally, in the first direction, two opposite ends of the second support sub-portion 391 both protrude from the second protrusion sub-portion 393.

Referring to FIG. 22 again, optionally, the first elastic portion 31 has a first arc-shaped transition face 315 connected between the first support sub-portion 311 and the first protrusion sub-portion 313. A radius of curvature R1 of the first arc-shaped transition face 315 satisfies 0.5 mm≤R1≤1.5 mm. Specifically, the radius of curvature R1 of the first arc-shaped transition face 315 may be, but is not limited to, 0.5 mm, 0.7 mm, 0.9 mm, 1.0 mm, 1.1 mm, 1.3 mm, 1.5 mm, and the like. This helps to ensure a smooth arc-shaped transition between the first support sub-portion 311 and the first protrusion sub-portion 313, thereby enhancing the mechanical strength of the first elastic portion 31. This prevents the occurrence of local mechanical weakness in the first elastic portion 31 during the assembly of the first thermal insulator 50 and the cover plate 40, which could lead to fracture and hinder the formation of an interference fit.

Optionally, the first arc-shaped transition face 315 may be, but is not limited to, a circular arc transition face.

In an embodiment, the first arc-shaped transition face 315 is implemented as two first arc-shaped transition faces 315. The two first arc-shaped transition faces 315 are disposed at intervals in the first direction. The two first arc-shaped transition faces 315 are recessed towards opposite directions, respectively. That is, each of the two first arc-shaped transition faces 315 is recessed towards the other of the two arc-shaped transition faces 315.

Referring to FIG. 23 again, optionally, the second elastic portion 39 has a second arc-shaped transition face 395 connected between the second support sub-portion 391 and the second protrusion sub-portion 393. A radius of curvature R2 of the second arc-shaped transition face 395 satisfies 0.5 mm≤R2≤1.5 mm. Specifically, the radius of curvature R2 of the second arc-shaped transition face 395 may be, but not limited to, 0.5 mm, 0.7 mm, 0.9 mm, 1.0 mm, 1.1 mm, 1.3 mm, 1.5 mm, and the like. This helps to ensure a smooth arc-shaped transition between the second support sub-portion 391 and the second protrusion sub-portion 393, thereby enhancing the mechanical strength of the second elastic portion 39. This prevents the occurrence of local mechanical weakness in the second elastic portion 39 during the assembly of the second thermal insulator 70 and the cover plate 40, which could lead to fracture and hinder the formation of an interference fit.

Optionally, the second arc-shaped transition face 395 may be, but is not limited to, a circular arc transition face.

In an embodiment, the second arc-shaped transition face 395 is implemented as two second arc-shaped transition faces 395. The two second arc-shaped transition faces 395 are disposed at intervals in the second direction. The two second arc-shaped transition faces 395 are recessed towards opposite directions, respectively. That is, each of the two second arc-shaped transition faces 395 is recessed towards the other of the two arc-shaped transition faces 395.

Optionally, an elastic modulus E1 of the first elastic portion 31 satisfies 2.0 GPa≤E1≤2.5 GPa. Specifically, the elastic modulus of the first elastic portion 31 may be, but is not limited to, 2.0 GPa, 2.1 GPa, 2.2 GPa, 2.3 GPa, 2.4 GPa, 2.5 GPa, or the like. If the elastic modulus of the first elastic portion 31 is too large, the first elastic portion 31 is easy to fracture, and it is difficult to press the first elastic portion 31 to assemble the first thermal insulator 50 and the cover plate 40. If the elastic modulus of the first elastic portion 31 is too small, an elastic force of the first elastic portion 31 is insufficient, and it may be difficult to achieve an interference fit between the first elastic portion 31, and the first thermal insulator 50 and the cover plate 40, thereby causing a gap between the first thermal insulator 50 and the cover plate 40. Therefore, when thermal runaway occurs in the energy-storage device 100, the high-temperature flammable gas may be discharged through the gap to one side of the first thermal insulator 50 away from the guide channel 101, thereby increasing the risk of spreading of thermal runaway, and reducing the safety of the energy-storage device 100.

Optionally, an elastic modulus E2 of the second elastic portion 39 satisfies 2.0 GPa≤ E2≤2.5 GPa. Specifically, the elastic modulus of the second elastic portion 39 may be, but is not limited to, 2.0 GPa, 2.1 GPa, 2.2 GPa, 2.3 GPa, 2.4 GPa, 2.5 GPa, or the like. If the elastic modulus of the second elastic portion 39 is too large, the second elastic portion 39 is easy to fracture, and it is difficult to press the second elastic portion 39 to assemble the second thermal insulator 70 and the cover plate 40. If the elastic modulus of the second elastic portion 39 is too small, an elastic force of the second elastic portion 39 is insufficient, and it may be difficult to achieve an interference fit between the second elastic portion 39, and the second thermal insulator 70 and the cover plate 40, thereby causing a gap between the second thermal insulator 70 and the cover plate 40. Therefore, when thermal runaway occurs in the energy-storage device 100, the high-temperature flammable gas may be discharged through the gap to one side of the second thermal insulator 70 away from the guide channel 101, thereby increasing the risk of spreading of thermal runaway, and reducing the safety of the energy-storage device 100.

Referring to FIG. 20 again, in some embodiments, the energy-storage device 100 further includes a wire harness 80 configured to electrically connect the multiple energy-storage units 10. The wire harness 80 is disposed at one side, away from the multiple explosion-proof valves 11, of at least one of the first thermal insulator 50 or the second thermal insulator 70.

It may be understood that the wire harness 80 may be provided only at one side of the first thermal insulator 50 away from the explosion-proof valve 11. Alternatively, the wire harness 80 may be provided only at one side of the second thermal insulator 70 away from the explosion-proof valve 11. Alternatively, the wire harness 80 may be provided at both one side of the first thermal insulator 50 away from the explosion-proof valve 11 and one side of the second thermal insulator 70 away from the explosion-proof valve 11.

In the embodiments, the wire harness 80 is disposed at one side, away from the multiple explosion-proof valves 11, of at least one of the first thermal insulator 50 or the second thermal insulator 70. In this way, the wire harness 80 may be separated from the guide channel 101. When thermal runaway occurs in some of the energy-storage units 10 of the energy-storage device 100, causing the explosion-proof valves 11 of some energy-storage units 10 to burst and release a large amount of high-temperature and high-pressure flammable gases in the energy-storage units 10 through the explosion-proof valves 11, the wire harness 80 can be shielded from the high-temperature flammable gas, thereby avoiding melt of an insulation layer of the wire harness 80, short circuits, exacerbation and expansion of thermal runaway.

Referring to FIG. 20 again, in some embodiments, the energy-storage device 100 further includes an electrical connector 90. The electrical connector 90 is disposed on one side of at least one of the first thermal insulator 50 or the second thermal insulation member 70 away from the explosion-proof valve 11 and is carried on the isolation plate 30. The electrical connector 90 is configured to electrically connect the multiple energy-storage units 10 to the wire harness 80. The electrical connector 90 may make the electrical connection between the multiple energy-storage units more stable.

It may be understood that the electrical connector 90 may be disposed only at one side of the first thermal insulator 50 away from the explosion-proof valve 11. Alternatively, the electrical connector 90 may be disposed only at one side of the second thermal insulator 70 away from the explosion-proof valve 11. Alternatively, the electrical connector 90 may be disposed both at one side of the first thermal insulator 50 away from the explosion-proof valve 11 and at one side of the second thermal insulator 70 away from the explosion-proof valve 11.

Optionally, the electrical connector 90 may be, but is not limited to, at least one of a copper bar, a copper plate, an aluminum sheet, and the like.

Figure 24:
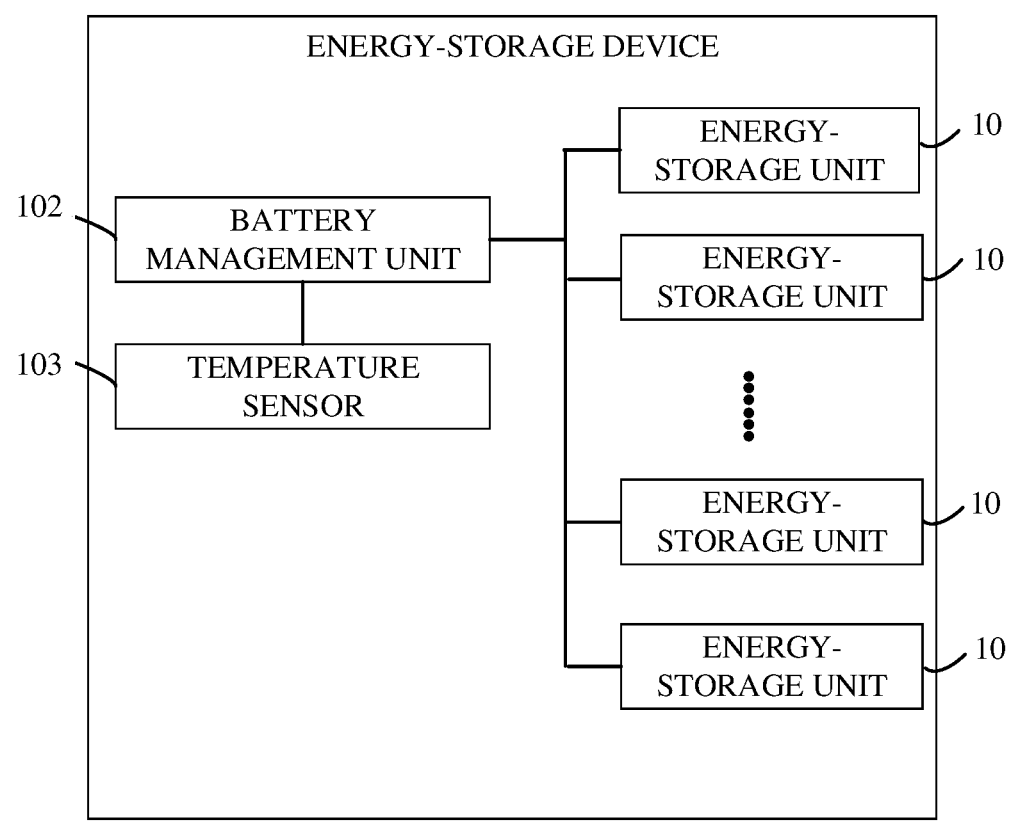
FIG. 24 is a circuit block diagram of an energy-storage device according to an embodiment of the disclosure.

Referring to FIG. 24, in some embodiments, the energy-storage device 100 further includes a battery management unit 102. The battery management unit 102 is electrically connected to the wire harness 80, and is configured to collect a parameter of the multiple energy-storage units 10 through the wire harness 80 to control operation of the multiple energy-storage units 10.

In other words, the battery management unit 102 is electrically connected to the electrical connector 90 through the wire harness 80, and is electrically connected to the multiple energy-storage units 10 through the electrical connector 90.

Optionally, the parameter of the energy-storage unit 10 may be, but is not limited to, parameter information such as a current, a voltage, a charging and discharging rate, and a capacity.

Optionally, the battery management unit 102 may be, but is not limited to, a controller, a processor, and the like. The processor includes one or more general-purpose processors. The general-purpose processor may be any type of device capable of processing an electronic instruction, including a central processing unit (CPU), a microprocessor, a micro-controller, a main processor, a controller, an application specific integrated circuit (ASIC), and the like. The processor may be used to execute various types of digital storage instructions, such as software or firmware programs stored in memory, that enable a computing device to provide a wide variety of services.

In some embodiments, the energy-storage device 100 further includes a temperature sensor 103. The temperature sensor 103 is disposed close to the energy-storage unit 10. The temperature sensor 103 is electrically connected to the battery management units 102. The temperature sensor 103 is configured to collect a temperature of the energy-storage unit 10 under the control of the battery management unit 102, and transmit the collected temperature information to the battery management unit 102, so that the battery management unit 102 can control operating states of the multiple energy-storage units 10 according to the temperature information. For example, when the temperature exceeds a threshold, the battery management unit 102 can control the energy-storage device 100 to stop charging and discharging to prevent excessive temperature.

In one embodiment, the temperature sensor 103 is disposed on a surface of the electrical connector 90 away from the energy-storage unit 10.

Optionally, there may be one or more temperature sensors 103. When there are multiple temperature sensors 103, the multiple temperature sensors 103 are disposed at intervals on the periphery of the multiple energy-storage units 10.

The term "embodiment" referred to herein means that a particular feature, structure, or feature described in connection with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is expressly and implicitly understood by those of ordinary skill in the art that an embodiment described herein may be combined with other embodiments. In addition, it may also be understood that, the features, structures, or characteristics described in the embodiments of the disclosure may be combined arbitrarily without contradiction, so as to form another embodiment without departing from the spirit and scope of the technical solutions of the disclosure.

Finally, it may be noted that the foregoing embodiments are merely intended to illustrate but not limit the technical solutions of the disclosure. Although the disclosure is described in detail with reference to the foregoing preferred embodiments, persons of ordinary skill in the art may understand that modifications or equivalent replacements can be made to the technical solutions of the disclosure without departing from the spirit and scope of the technical solutions of the disclosure.

What is claimed is:

1. An energy-storage device, comprising:
a plurality of energy-storage units sequentially arranged in a first direction, wherein each of the plurality of energy-storage units comprises an explosion-proof valve;
an isolation plate, wherein the isolation plate is located at one side of each of the plurality of energy-storage units where the explosion-proof valve is located, extends in the first direction, and defines a plurality of vents arranged at intervals in the first direction, and wherein each of the plurality of vents is at least partially aligned with a corresponding explosion-proof valve, and different explosion-proof valves are aligned with different vents; and
a first thermal insulator and a second thermal insulator, wherein the first thermal insulator and the second thermal insulator are both located at one side of the isolation plate away from the plurality of energy-storage units, the first thermal insulator and the second thermal insulator are spaced apart from each other in a second direction at two opposite sides of each of the plurality of explosion-proof valves, the first thermal insulator, the second thermal insulator, and the isolation plate cooperatively define a guide channel, two opposite ends of the guide channel are both in communication with an external environment and a space in which each of the plurality of explosion-proof valves faces the isolation plate, and the first direction intersects the second direction;
wherein the first thermal insulator comprises a first thermal insulation portion and a second thermal insulation portion that are connected to each other and arranged in the first direction; the second thermal insulator comprises a third thermal insulation portion and a fourth thermal insulation portion that are connected to each other and arranged in the first direction; the first thermal insulation portion faces the third thermal insulation portion, and a distance between the first thermal insulation portion and the third thermal insulation portion gradually increases in a direction from one end of the first thermal insulation portion close to the second thermal insulation portion and one end of the third thermal insulation portion close to the fourth thermal insulation portion to another end of the first thermal insulation portion away from the second thermal insulation portion and another end of the third thermal insulation portion away from the fourth thermal insulation portion; and the second thermal insulation portion faces the fourth thermal insulation portion, and a distance between the second thermal insulation portion and the fourth thermal insulation portion gradually increases in a direction from one end of the second thermal insulation portion close to the first thermal insulation portion and one end of the fourth thermal insulation portion close to the third thermal insulation portion to another end of the second thermal insulation portion away from the first thermal insulation portion and another end of the fourth thermal insulation portion away from the third thermal insulation portion;

wherein an angle α between a surface of the first thermal insulation portion facing the third thermal insulation portion and a surface of the third thermal insulation portion facing the first thermal insulation portion satisfies 5°≤α≤30°; an angle β between a surface of the second thermal insulation portion facing the fourth thermal insulation portion and a surface of the fourth thermal insulation portion facing the second thermal insulation portion satisfies 5°≤β≤30°;

wherein the isolation plate comprises a main body portion, a first mounting portion, a second mounting portion, a third mounting portion, and a fourth mounting portion, the main body portion defines the plurality of vents arranged at intervals in the first direction, and the first mounting portion, the second mounting portion, the third mounting portion, and the fourth mounting portion are sequentially arranged at intervals in the second direction on a surface of the main body portion away from the plurality of energy-storage units; the first mounting portion and the second mounting portion are both arranged at one side of each of the plurality of explosion-proof valves, the main body portion, the first mounting portion, and the second mounting portion cooperatively define a first fitting groove, the first thermal insulator is fitted with the first fitting groove; and the third mounting portion and the fourth mounting portion are both arranged at one side of each of the plurality of explosion-proof valves away from the first mounting portion and the second mounting portion, the main body portion, the third mounting portion, and the fourth mounting portion cooperatively define a second fitting groove, and the second thermal insulator is fitted with the second fitting groove;

wherein the energy-storage device further comprises a frame body and a cover plate, the frame body defines an accommodating groove for receiving the plurality of energy-storage units, the isolation plate, the first thermal insulator, and the second thermal insulator, and the cover plate seals the accommodating groove and is fixed to the frame body; the isolation plate further comprises a first elastic portion and a second elastic portion, and the first elastic portion and the second elastic portion are both arranged on the surface of the main body portion away from the plurality of energy-storage units; at least part of the first elastic portion is received in the first fitting groove and abuts against the first thermal insulator, so that an end face of the first thermal insulator away from the first elastic portion is in tight contact with a surface of the cover plate facing the accommodating groove; and at least part of the second elastic portion is received in the second fitting groove and abuts against the second thermal insulator, so that an end face of the second thermal insulator away from the second elastic portion is in tight contact with the surface of the cover plate facing the accommodating groove; and wherein the first elastic portion comprises a first support sub-portion and a first protrusion sub-portion, the first support sub-portion is connected to a surface of the main body portion facing the first thermal insulator, the first protrusion sub-portion protrudes from a surface of the first support sub-portion away from the main body portion and abuts against the first thermal insulator, and a height h1 of the first protrusion sub-portion satisfies 0.5 mm≤h1≤1.5 mm in a direction from the first support sub-portion to the first protrusion sub-portion; and the second elastic portion comprises a second support sub-portion and a second protrusion sub-portion, wherein the second support sub-portion is connected to a surface of the main body portion facing the second thermal insulator, the second protrusion sub-portion protrudes from a surface of the second support sub-portion away from the main body portion and abuts against the second thermal insulator, and a height h2 of the second protrusion sub-portion satisfies 0.5 mm≤ h2≤1.5 mm in a direction from the second support sub-portion to the second protrusion sub-portion.

2. The energy-storage device of claim 1, wherein a minimum distance d between the first thermal insulator and the second thermal insulator satisfies 8 mm≤d≤25 mm.

3. The energy-storage device of claim 1, wherein an elastic modulus E1 of the first elastic portion satisfies 2.0 GPa≤E1≤2.5 GPa, and an elastic modulus E2 of the second elastic portion satisfies 2.0 GPa≤E2≤2.5 GPa.

4. The energy-storage device of claim 1, wherein the first elastic portion has a first arc-shaped transition face connected between the first support sub-portion and the first protrusion sub-portion, and a radius of curvature R1 of the first arc-shaped transition face satisfies 0.5 mm≤ R1≤1.5 mm; and the second elastic portion has a second arc-shaped transition face connected between the second support sub-portion and the second protrusion sub-portion, and a radius of curvature R2 of the second arc-shaped transition face satisfies 0.5 mm≤R2≤1.5 mm.

5. The energy-storage device of claim 1, further comprising a wire harness configured to electrically connect the plurality of energy-storage units, wherein the wire harness is disposed at one side, away from the plurality of explosion-proof valves, of at least one of the first thermal insulator or the second thermal insulator;

the energy-storage device further comprises a battery management unit, wherein the battery management unit is electrically connected to the wire harness, and is configured to collect a parameter of the plurality of energy-storage units through the wire harness to control operation of the plurality of energy-storage units.

6. An electricity-consumption system, comprising:
an electricity-consumption apparatus; and
an energy-storage device configured to power the electricity-consumption apparatus;
wherein the energy-storage device comprises:
a plurality of energy-storage units sequentially arranged in a first direction, wherein each of the plurality of energy-storage units comprises an explosion-proof valve;
an isolation plate, wherein the isolation plate is located at one side of each of the plurality of energy-storage units where the explosion-proof valve is located, extends in the first direction, and defines a plurality of vents arranged at intervals in the first direction, and wherein each of the plurality of vents is at least partially aligned with a corresponding explosion-proof valve, and different explosion-proof valves are aligned with different vents; and
a first thermal insulator and a second thermal insulator, wherein the first thermal insulator and the second thermal insulator are both located at one side of the isolation plate away from the plurality of energy-storage units, the first thermal insulator and the second thermal insulator are spaced apart from each other in a second direction at two opposite sides of each of the plurality of explosion-proof valves, the first thermal insulator, the second thermal insulator, and the isolation plate cooperatively define a guide channel, two opposite ends of the guide channel are both in communication with an external environment and a space in which each of the plurality of explosion-proof valves faces the isolation plate, and the first direction intersects the second direction;

wherein the first thermal insulator comprises a first thermal insulation portion and a second thermal insulation portion that are connected to each other and arranged in the first direction; the second thermal insulator comprises a third thermal insulation portion and a fourth thermal insulation portion that are connected to each other and arranged in the first direction; the first thermal insulation portion faces the third thermal insulation portion, and a distance between the first thermal insulation portion and the third thermal insulation portion gradually increases in a direction from one end of the first thermal insulation portion close to the second thermal insulation portion and one end of the third thermal insulation portion close to the fourth thermal insulation portion to another end of the first thermal insulation portion away from the second thermal insulation portion and another end of the third thermal insulation portion away from the fourth thermal insulation portion; and the second thermal insulation portion faces the fourth thermal insulation portion, and a distance between the second thermal insulation portion and the fourth thermal insulation portion gradually increases in a direction from one end of the second thermal insulation portion close to the first thermal insulation portion and one end of the fourth thermal insulation portion close to the third thermal insulation portion to another end of the second thermal insulation portion away from the first thermal insulation portion and another end of the fourth thermal insulation portion away from the third thermal insulation portion;

wherein an angle $\alpha$ between a surface of the first thermal insulation portion facing the third thermal insulation portion and a surface of the third thermal insulation portion facing the first thermal insulation portion satisfies $5°\leq\alpha\leq30°$; an angle $\beta$ between a surface of the second thermal insulation portion facing the fourth thermal insulation portion and a surface of the fourth thermal insulation portion facing the second thermal insulation portion satisfies $5°\leq\beta\leq30°$;

wherein the isolation plate comprises a main body portion, a first mounting portion, a second mounting portion, a third mounting portion, and a fourth mounting portion, the main body portion defines the plurality of vents arranged at intervals in the first direction, and the first mounting portion, the second mounting portion, the third mounting portion, and the fourth mounting portion are sequentially arranged at intervals in the second direction on a surface of the main body portion away from the plurality of energy-storage units; the first mounting portion and the second mounting portion are both arranged at one side of each of the plurality of explosion-proof valves, the main body portion, the first mounting portion, and the second mounting portion cooperatively define a first fitting groove, the first thermal insulator is fitted with the first fitting groove; and the third mounting portion and the fourth mounting portion are both arranged at one side of each of the plurality of explosion-proof valves away from the first mounting portion and the second mounting portion, the main body portion, the third mounting portion, and the fourth mounting portion cooperatively define a second fitting groove, and the second thermal insulator is fitted with the second fitting groove;

wherein the energy-storage device further comprises a frame body and a cover plate, the frame body defines an accommodating groove for receiving the plurality of energy-storage units, the isolation plate, the first thermal insulator, and the second thermal insulator, and the cover plate seals the accommodating groove and is fixed to the frame body; the isolation plate further comprises a first elastic portion and a second elastic portion, and the first elastic portion and the second elastic portion are both arranged on the surface of the main body portion away from the plurality of energy-storage units; at least part of the first elastic portion is received in the first fitting groove and abuts against the first thermal insulator, so that an end face of the first thermal insulator away from the first elastic portion is in tight contact with a surface of the cover plate facing the accommodating groove; and at least part of the second elastic portion is received in the second fitting groove and abuts against the second thermal insulator, so that an end face of the second thermal insulator away from the second elastic portion is in tight contact with the surface of the cover plate facing the accommodating groove; and wherein the first elastic portion comprises a first support sub-portion and a first protrusion sub-portion, the first support sub-portion is connected to a surface of the main body portion facing the first thermal insulator, the first protrusion sub-portion protrudes from a surface of the first support sub-portion away from the main body portion and abuts against the first thermal insulator, and a height h1 of the first protrusion sub-portion satisfies $0.5\text{ mm}\leq h1\leq1.5\text{ mm}$ in a direction from the first support sub-portion to the first protrusion sub-portion; and the second elastic portion comprises a second support sub-portion and a second protrusion sub-portion, wherein the second support sub-portion is connected to a surface of the main body portion facing the second thermal insulator, the second protrusion sub-portion protrudes from a surface of the second support sub-portion away from the main body portion and abuts against the second thermal insulator, and a height h2 of the second protrusion sub-portion satisfies $0.5\text{ mm}\leq h2\leq1.5\text{ mm}$ in a direction from the second support sub-portion to the second protrusion sub-portion.

7. The electricity-consumption system of claim 6, wherein a minimum distance d between the first thermal insulator and the second thermal insulator satisfies $8\text{ mm}\leq d\leq25\text{ mm}$.

8. The electricity-consumption system of claim 6, wherein an elastic modulus E1 of the first elastic portion satisfies $2.0\text{ GPa}\leq E1\leq2.5\text{ GPa}$, and an elastic modulus E2 of the second elastic portion satisfies $2.0\text{ GPa}\leq E2\leq2.5\text{ GPa}$.

9. The electricity-consumption system of claim 6, wherein the first elastic portion has a first arc-shaped transition face connected between the first support sub-portion and the first protrusion sub-portion, and a radius of curvature R1 of the first arc-shaped transition face satisfies $0.5\text{ mm}\leq R1\leq1.5\text{ mm}$; and the second elastic portion has a second arc-shaped transition face connected between the second support sub-portion and the second protrusion sub-portion, and a radius of curvature R2 of the second arc-shaped transition face satisfies 0.5 mm≤R2≤1.5 mm.

10. The electricity-consumption system of claim 6, further comprising a wire-harness configured to electrically connect the plurality of energy-storage units, wherein the wire harness is disposed at one side, away from the plurality of explosion-proof valves, of at least one of the first thermal insulator or the second thermal insulator;

the energy-storage device further comprises a battery management unit, wherein the battery management unit is electrically connected to the wire harness, and is configured to collect a parameter of the plurality of energy-storage units through the wire harness to control operation of the plurality of energy-storage units.

11. An energy-storage system, comprising:

an electrical energy conversion device configured to convert energy other than electrical energy into electrical energy;

an energy-storage device, wherein the energy-storage device is electrically connected to the electrical energy conversion device and is configured to store electrical energy of the electrical energy conversion device; and an electricity-consumption load electrically connected to the electrical energy conversion device and the energy-storage device, and configured to operate by using the electrical energy of the electrical energy conversion device or electrical energy of the energy-storage device;

wherein the energy-storage device comprises:

a plurality of energy-storage units sequentially arranged in a first direction, wherein each of the plurality of energy-storage units comprises an explosion-proof valve;

an isolation plate, wherein the isolation plate is located at one side of each of the plurality of energy-storage units where the explosion-proof valve is located, extends in the first direction, and defines a plurality of vents arranged at intervals in the first direction, and wherein each of the plurality of vents is at least partially aligned with a corresponding explosion-proof valve, and different explosion-proof valves are aligned with different vents; and a first thermal insulator and a second thermal insulator, wherein the first thermal insulator and the second thermal insulator are both located at one side of the isolation plate away from the plurality of energy-storage units, the first thermal insulator and the second thermal insulator are spaced apart from each other in a second direction at two opposite sides of each of the plurality of explosion-proof valves, the first thermal insulator, the second thermal insulator, and the isolation plate cooperatively define a guide channel, two opposite ends of the guide channel are both in communication with an external environment and a space in which each of the plurality of explosion-proof valves faces the isolation plate, and the first direction intersects the second direction;

wherein the first thermal insulator comprises a first thermal insulation portion and a second thermal insulation portion that are connected to each other and arranged in the first direction; the second thermal insulator comprises a third thermal insulation portion and a fourth thermal insulation portion that are connected to each other and arranged in the first direction; the first thermal insulation portion faces the third thermal insulation portion, and a distance between the first thermal insulation portion and the third thermal insulation portion gradually increases in a direction from one end of the first thermal insulation portion close to the second thermal insulation portion and one end of the third thermal insulation portion close to the fourth thermal insulation portion to another end of the first thermal insulation portion away from the second thermal insulation portion and another end of the third thermal insulation portion away from the fourth thermal insulation portion; and the second thermal insulation portion faces the fourth thermal insulation portion, and a distance between the second thermal insulation portion and the fourth thermal insulation portion gradually increases in a direction from one end of the second thermal insulation portion close to the first thermal insulation portion and one end of the fourth thermal insulation portion close to the third thermal insulation portion to another end of the second thermal insulation portion away from the first thermal insulation portion and another end of the fourth thermal insulation portion away from the third thermal insulation portion;

wherein an angle α between a surface of the first thermal insulation portion facing the third thermal insulation portion and a surface of the third thermal insulation portion facing the first thermal insulation portion satisfies 5°≤α≤30°; an angle β between a surface of the second thermal insulation portion facing the fourth thermal insulation portion and a surface of the fourth thermal insulation portion facing the second thermal insulation portion satisfies 5°≤β≤30°;

wherein the isolation plate comprises a main body portion, a first mounting portion, a second mounting portion, a third mounting portion, and a fourth mounting portion, the main body portion defines the plurality of vents arranged at intervals in the first direction, and the first mounting portion, the second mounting portion, the third mounting portion, and the fourth mounting portion are sequentially arranged at intervals in the second direction on a surface of the main body portion away from the plurality of energy-storage units; the first mounting portion and the second mounting portion are both arranged at one side of each of the plurality of explosion-proof valves, the main body portion, the first mounting portion, and the second mounting portion cooperatively define a first fitting groove, the first thermal insulator is fitted with the first fitting groove; and the third mounting portion and the fourth mounting portion are both arranged at one side of each of the plurality of explosion-proof valves away from the first mounting portion and the second mounting portion, the main body portion, the third mounting portion, and the fourth mounting portion cooperatively define a second fitting groove, and the second thermal insulator is fitted with the second fitting groove;

wherein the energy-storage device further comprises a frame body and a cover plate, the frame body defines an accommodating groove for receiving the plurality of energy-storage units, the isolation plate, the first thermal insulator, and the second thermal insulator, and the cover plate seals the accommodating groove and is fixed to the frame body; the isolation plate further comprises a first elastic portion and a second elastic portion, and the first elastic portion and the second elastic portion are both arranged on the surface of the main body portion away from the plurality of energy-storage units; at least part of the first elastic portion is received in the first fitting groove and abuts against the first thermal insulator, so that an end face of the first thermal insulator away from the first elastic portion is in tight contact with a surface of the cover plate facing the accommodating groove; and at least part of the second elastic portion is received in the second fitting groove and abuts against the second thermal insulator, so that an end face of the second thermal insulator away from the second elastic portion is in tight contact with the surface of the cover plate facing the accommodating groove; and wherein the first elastic portion comprises a first support sub-portion and a first protrusion sub-portion, the first support sub-portion is connected to a surface of the main body portion facing the first thermal insulator, the first protrusion sub-portion protrudes from a surface of the first support sub-portion away from the main body portion and abuts against the first thermal insulator, and a height h1 of the first protrusion sub-portion satisfies 0.5 mm≤h1≤1.5 mm in a direction from the first support sub-portion to the first protrusion sub-portion; and the second elastic portion comprises a second support sub-portion and a second protrusion sub-portion, wherein the second support sub-portion is connected to a surface of the main body portion facing the second thermal insulator, the second protrusion sub-portion protrudes from a surface of the second support sub-portion away from the main body portion and abuts against the second thermal insulator, and a height h2 of the second protrusion sub-portion satisfies 0.5 mm≤h2≤1.5 mm in a direction from the second support sub-portion to the second protrusion sub-portion.

12. The energy-storage system of claim 11, wherein a minimum distance d between the first thermal insulator and the second thermal insulator satisfies 8 mm≤d≤25 mm.

13. The energy-storage system of claim 11, wherein an elastic modulus E1 of the first elastic portion satisfies 2.0 GPa≤E1≤2.5 GPa, and an elastic modulus E2 of the second elastic portion satisfies 2.0 GPa≤E2≤2.5 GPa.

14. The energy-storage system of claim 11, wherein the first elastic portion has a first arc-shaped transition face connected between the first support sub-portion and the first protrusion sub-portion, and a radius of curvature R1 of the first arc-shaped transition face satisfies 0.5 mm≤R1≤1.5 mm; and the second elastic portion has a second arc-shaped transition face connected between the second support sub-portion and the second protrusion sub-portion, and a radius of curvature R2 of the second arc-shaped transition face satisfies 0.5 mm≤R2≤1.5 mm.

15. The energy-storage system of claim 11, further comprising a wire harness configured to electrically connect the plurality of energy-storage units, wherein the wire harness is disposed at one side, away from the plurality of explosion-proof valves, of at least one of the first thermal insulator or the second thermal insulator;

the energy-storage device further comprises a battery management unit, wherein the battery management unit is electrically connected to the wire harness, and is configured to collect a parameter of the plurality of energy-storage units through the wire harness to control operation of the plurality of energy-storage units.

* * * * *